United States Patent
Lee et al.

(10) Patent No.: US 12,238,789 B2
(45) Date of Patent: *Feb. 25, 2025

(54) RANDOM ACCESS METHOD CONSIDERING A COVERAGE LEVEL, SUBCARRIER SPACING CONFIGURATION AND/OR MULTI-TONE CONFIGURATION IN INTERNET OF THINGS ENVIRONMENT

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Yunmin Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,846

(22) Filed: Sep. 19, 2023

(65) Prior Publication Data

US 2024/0008064 A1     Jan. 4, 2024

Related U.S. Application Data

(63) Continuation of application No. 17/342,862, filed on Jun. 9, 2021, now Pat. No. 11,805,534, which is a
(Continued)

(30) Foreign Application Priority Data

Jan. 29, 2016   (KR) .................. 10-2016-0011893
Mar. 3, 2016    (KR) .................. 10-2016-0025783
(Continued)

(51) Int. Cl.
*H04W 72/04*      (2023.01)
*H04W 72/02*      (2009.01)
(Continued)

(52) U.S. Cl.
CPC ........... *H04W 76/10* (2018.02); *H04W 72/02* (2013.01); *H04W 72/51* (2023.01);
(Continued)

(58) Field of Classification Search
CPC ..... H04W 76/10; H04W 72/02; H04W 72/51; H04W 74/0833; H04W 4/70;
(Continued)

(56) References Cited

U.S. PATENT DOCUMENTS 9,485,765 B2   11/2016  Kim et al.
9,661,663 B1    5/2017  Lin et al.
(Continued)

FOREIGN PATENT DOCUMENTS

CN   102550109 A      7/2012
CN   106961731 B  *   8/2023   ........... H04L 5/0007
(Continued)

OTHER PUBLICATIONS

Huawei et al., "NB-PRACH design," 3GPP TSG RAN WG1 NB-IoT Ad-Hoc Meeting held on Jan. 18-20, 2016 in Budapest, HU, document No. R1-160025 (9 pages).
(Continued)

*Primary Examiner* — Jay P Patel
(74) *Attorney, Agent, or Firm* — NSIP Law

(57) ABSTRACT

Provided is random access method, performed by terminal for uplink data transmission during random access process between cellular based machine communication terminal and base station. The method includes performing random access process between cellular based machine communication terminal and base station, and the random access process includes selecting random access resource by considering coverage level and whether to support multi-tone transmission or not. Terminal can perform efficient random access process in response to coverage level, subcarrier
(Continued)

spacing configuration, multi-tone configuration when machine communication terminal or machine communication device which operates in cellular based IoT system perform random access, number of repetition may be increased, when coverage level is changed, by minimizing the change in coverage level, and operation time of the terminal, due to standing by up to PRACH resource corresponding to the coverage level, may be reduced to reduce energy consumption and to enhance delay time performance.

3 Claims, 17 Drawing Sheets

Related U.S. Application Data continuation of application No. 16/591,704, filed on Oct. 3, 2019, now Pat. No. 11,064,495, which is a continuation of application No. 15/524,466, filed as application No. PCT/KR2017/000939 on Jan. 26, 2017, now Pat. No. 10,506,605.

(30) Foreign Application Priority Data

| | | |
|---|---|---|
| Apr. 8, 2016 | (KR) | 10-2016-0043317 |
| May 12, 2016 | (KR) | 10-2016-0058374 |
| Nov. 18, 2016 | (KR) | 10-2016-0154109 |

(51) Int. Cl.
| | |
|---|---|
| *H04W 72/51* | (2023.01) |
| *H04W 74/0833* | (2024.01) |
| *H04W 76/10* | (2018.01) |
| *H04L 1/1867* | (2023.01) |
| *H04W 4/70* | (2018.01) |

(52) U.S. Cl.
CPC ........ *H04W 74/0833* (2013.01); *H04L 1/1893* (2013.01); *H04W 4/70* (2018.02); *Y02D 30/70* (2020.08)

(58) Field of Classification Search
CPC . H04W 74/006; H04W 16/18; H04W 74/004; H04W 84/04; H04L 1/1893; H04L 5/00; Y02D 30/70
See application file for complete search history.

(56) References Cited

U.S. PATENT DOCUMENTS

| | | | |
|---|---|---|---|
| 9,750,026 | B1 | 8/2017 | Saxena et al. |
| 9,867,191 | B2 * | 1/2018 | Wong ................ H04L 27/2602 |
| 10,721,775 | B2 | 7/2020 | Park et al. |
| 10,728,077 | B2 * | 7/2020 | Yi ........................ H04W 76/27 |
| 10,743,330 | B2 * | 8/2020 | Xia ....................... H04L 5/0048 |
| 10,743,351 | B2 | 8/2020 | Hwang et al. |
| 10,925,082 | B2 * | 2/2021 | Ye ........................ H04L 5/1469 |
| 10,945,237 | B2 | 3/2021 | Yi et al. |
| 11,064,495 | B2 | 7/2021 | Lee et al. |
| 11,259,337 | B2 | 2/2022 | Park et al. |
| 11,330,582 | B2 | 5/2022 | Yi et al. |
| 11,882,550 | B2 * | 1/2024 | Yi ........................ H04L 5/0044 |
| 2011/0317633 | A1 | 12/2011 | Tan et al. |
| 2012/0275305 | A1 | 11/2012 | Lin |
| 2015/0215911 | A1 | 7/2015 | Dimou et al. |
| 2016/0021646 | A1 | 1/2016 | Hu et al. |
| 2016/0127936 | A1 | 5/2016 | Chatterjee et al. |
| 2017/0006599 | A1 | 1/2017 | Dinan |
| 2017/0006640 | A1 | 1/2017 | Dinan |
| 2017/0019930 | A1 | 1/2017 | Lee et al. |
| 2017/0099660 | A1 | 4/2017 | Oh |
| 2017/0135132 | A1 | 5/2017 | Selvaganapathy |
| 2017/0201989 | A1 | 7/2017 | Fakoorian et al. |
| 2017/0208591 | A1 | 7/2017 | Rico Alvarino et al. |
| 2017/0223743 | A1 | 8/2017 | Lin et al. |
| 2017/0230979 | A1 | 8/2017 | Saxena et al. |
| 2017/0238284 | A1 | 8/2017 | Tseng et al. |
| 2017/0311326 | A1 | 10/2017 | Wong et al. |
| 2017/0332404 | A1 | 11/2017 | Wang et al. |
| 2018/0139651 | A1 | 5/2018 | Kim et al. |
| 2018/0145819 | A1 | 5/2018 | Axmon et al. |
| 2018/0160453 | A1 | 6/2018 | Lee et al. |
| 2018/0184246 | A1 | 6/2018 | Ryu et al. |
| 2018/0184439 | A1 | 6/2018 | Lee et al. |
| 2018/0206271 | A1 | 7/2018 | Chatterjee et al. |
| 2018/0206290 | A1 | 7/2018 | Dai |
| 2018/0249509 | A1 | 8/2018 | Yi |
| 2018/0376524 | A1 | 12/2018 | Lee et al. |
| 2019/0037566 | A1 * | 1/2019 | Zhang ............... H04W 72/0453 |
| 2019/0044782 | A1 | 2/2019 | Zeng et al. |
| 2019/0068427 | A1 | 2/2019 | Hwang et al. |
| 2019/0174554 | A1 | 6/2019 | Deenoo et al. |
| 2019/0215872 | A1 * | 7/2019 | Park .................... H04W 52/0216 |
| 2019/0274168 | A1 | 9/2019 | Hwang et al. |
| 2020/0288509 | A1 | 9/2020 | Park et al. |
| 2021/0022117 | A1 | 1/2021 | Yi et al. |
| 2021/0195567 | A1 | 6/2021 | Yi et al. |
| 2022/0232543 | A1 | 7/2022 | Yi et al. |
| 2024/0098526 | A1 * | 3/2024 | Matsumura ........... H04L 5/0023 |

FOREIGN PATENT DOCUMENTS

| | | | |
|---|---|---|---|
| EP | | 2 469 952 A2 | 6/2012 |
| EP | | 3 651 498 A1 | 5/2020 |
| KR | 10-2015-0037757 A | | 4/2015 |
| WO | WO 2013/176473 A1 | | 11/2013 |
| WO | WO 2016/109982 A1 | | 7/2016 |

OTHER PUBLICATIONS

Huawei et al., "Further NB-IOT random access physical layer aspects," 3GPP TSG RAN WG1 NB-IoT Ad-Hoc Meeting held on Jan. 18-20, 2016 in Budapest, HU, document No. R1-160035 (5 pages).
Ericsson, "NB-IoT- NB-PUSCH design," 3GPP TSG-RAN1 NB-IoT ad Hoc Discussion held on Jan. 18-20, 2016 in Budapest, HU, document No. R1-160085 (9 pages).
R1-160132 "On Random access for NB-IoT", 3GPP TSG RAN WG1 NB-IoT Ad-Hoc Meeting, Intel Corporation, Budapest, Jan. 18-20, 2016 (10 pages in English).
R2-160496 "Random Access procedure for NB-IoT" Discussion and Decision, 3GPP TSG-RAN WG2 #NB-IoT adhoc, Budapest, Hungary, Jan. 19-21, 2016, (3 pages in English).
R1-160171 "Discussion on Msg 3 transmission" Discussion and Decision, 3GPP TSG RAN WG1 NB-IoT Ad-Hoc Meeting, Budapest, Hungary, Jan. 18-20, 2016, (3 pages in English).
R1-161906 "DCI format design" Discussion and Decision, 3GPP TSG RAN WG1 NB-IoT Ad- Hoc Meeting, Sophia Antipolis, France, Mar. 22-24, 2016, (5 pages in English).
3GPP TS 36.211, 3rd Generation Partnership Project; Technical Specification Group Radio Access Network; Evolved Universal Terrestrial Radio Access (E-UTRA); Physical channels and modulation (Release 13), Mar. 2016, (155 pages in English).
Chinese Office Action issued on Oct. 9, 2021, in counterpart Chinese Patent Application No. 201780007132.9 (17 pages in Chinese).
Korean Office Action issued on Oct. 19, 2022, in counterpart Korean Patent Application No. 10-2016-0154109 (6 pages in Korean).

* cited by examiner

RANDOM ACCESS METHOD CONSIDERING A COVERAGE LEVEL, SUBCARRIER SPACING CONFIGURATION AND/OR MULTI-TONE CONFIGURATION IN INTERNET OF THINGS ENVIRONMENT

CROSS-REFERENCE TO RELATED APPLICATIONS

This application is a continuation of U.S. patent application Ser. No. 17/342,862 filed on Jun. 9, 2021, which is a continuation of U.S. patent application Ser. No. 16/591,704 filed on Oct. 3, 2019, which is a Continuation Application of U.S. patent application Ser. No. 15/524,466 Filed on May 4, 2017, which claims the benefit under 35 USC 119(a) of PCT Application No. PCT/KR2017/000939, filed on Jan. 26, 2017, which claims the benefit of Korean Patent Application No. 10-2016-0011893 filed Jan. 29, 2016, Korean Patent Application No. 10-2016-0025783 filed on Mar. 3, 2016, and Korean Patent Application No. 10-2016-0043317 filed on Apr. 8, 2016, Korean Patent Application No. 10-2016-0058374 filed on May 12, 2016, and Korean Patent Application No. 10-2016-0154109 filed on Nov. 18, 2016 in the Korean Intellectual Property Office, the entire disclosure of which is incorporated herein by reference for all purposes.

BACKGROUND

1. Field

The present invention relates to methods for performing a random access in a machine communication terminal or a machine communication device, and more particularly, to methods for efficiently select a preamble and performing a random access when a machine communication terminal or a machine communication device in a cellular based Internet of Things (IoT) environment continuously fails to perform a random access process.

2. Related Art

A cellular based IoT system for implementing an Internet of Things environment, aims at providing reliable connection based on wide coverage in a licensed band in order to provide services to massive terminals, for example, machine communication terminals or machine communication devices.

As an example of the cellular based IoT system, narrow band-IoT (NB-IoT) provides an IoT service suitable for a sensor-centered application at low-speed data rate by using a bandwidth smaller than a bandwidth of 1.4 MHz of machine type communication (MTC), that is, a bandwidth smaller than the bandwidth 1.4 MHz in both uplink and downlink, for example, 180 kHz.

In the NB-IoT, OFDMA is used in the downlink and a very small subcarrier spacing, for example, a 15-kHz subcarrier spacing may be used.

In the NB-IoT uplink, SC-FDMA may be used. In the NB-IoT uplink, a 3.75-kHz subcarrier spacing or the 15-kHz subcarrier spacing may be used.

A random access as a procedure for a kind of data transmission in which the terminal transmits data to a base station at a predetermined time for connection to the base station and data transmission by the terminal serves to start communication which starts in all terminals. In particular, a method is requested, in which the base station may successfully receive a signal during the random access process, which is transmitted from a terminal which is very far away, in which coverage of 20 dB or more is extended in order to reflect an NB-IoT service characteristic requiring a wide coverage area and may also successfully transmit a response signal to the received signal to the corresponding terminal in a long distance.

When SC-FDMA based uplink of the NB-IoT is designed, a design of a physical random access channel (PRACH) needs to be modified in order to perform an LTE random access procedure due to the reduced bandwidth of the NB-IoT and the modification may partially influence the LTE random access procedure.

The LTE random access is used for multiple purposes such as an initial access and a scheduling request at the time of configuring a radio link and a primary purpose of the random access is to prepare for the data transmission by achieving uplink synchronization. The random access may become a contention-based random access or a contention-free random access.

SUMMARY

In the cellular based IoT system, for example, a Narrow band-Internet of Things (NB-IoT) system, a scheme is considered, which divisionally provides the service separately in a plurality of coverage classes (CCs) or coverage levels (CLs) according to a channel state of the terminal. The coverage classes (CCs) or the coverage levels (CLs) are generally classified into normal coverage (hereinafter, referred to as CC1 or CL1), robust coverage (hereinafter, referred to as CC2 or CL2), and extreme coverage (hereinafter, CC3 or CL3) and the base station allows the terminals which belong to each coverage class (CC) or coverage level (CL) to receive an optimized service according to the channel state by differentiating parameters, such as locations of resources used by the terminal, the number of repetition transmission, a modulation and coding scheme (MCS), and the like according to the coverage class (CC) or the coverage level (CL).

Further, the NB-IoT may define three configurations according to the subcarrier spacing and/or whether to support multi-tone transmission or not which the terminal uses during uplink transmission, and the NB-IoT may support the defined coverage class or coverage level. Performance characteristics for respective subcarrier spacing configurations and/or multi-tone configurations during the uplink transmission are shown in Table 1.

| | |
|---|---|
| 3.75 kHz, single-tone | Bad channel state, low transmission rate, and terminal positioned on the edge of a cell |
| 15 kHz, single-tone | Intermediate channel state, intermediate transmission rate, and terminal positioned within a radius up to approximately 10 km from the center of the cell |
| 15 kHz, multi-tone | Good channel state, high transmission rate, terminal positioned at the center of the cell |

During the random access process by the terminal in the existing discussed NB-IoT system, in the case of the failure, in the case where a random access response (Message2) to transmission of a preamble (Message1) may not be received when the random access is performed in the coverage class (CC) or coverage level (CL) selected by the terminal, or in the case where a Contention Resolution (Message4) which is a response to transmission of a connection request (Message3) may not be received, the random access process is reperformed and the preamble is transmitted again. In this case, when continuous preamble retransmission occurs at a predetermined number of times or more, the terminal performs the random access again by changing the current coverage level (CC) or coverage level (CL) to a coverage class (CC) or coverage level (CL) supporting the channel state which is lower by one level to prepare for the data transmission. However, the procedure for reperforming the random access after changing the coverage class (CC) or the coverage level (CL) has a problem that an operation time and an operation time significantly increase because the terminal needs to perform the random access process in the corresponding PRACH at the increased number of repetition again from the beginning at the time of performing the random access in the changed coverage class (CC) or coverage level.

Therefore, example embodiments of the present invention provide methods for sequentially using preamble resources in the random access process by considering performance for each level of a subcarrier spacing and/or multi-tone configuration in each coverage class (CC) or coverage level (CL) in response to the subcarrier spacing and/or multi-tone configuration when the terminal performs the random access in the cellular IoT system, for example, the NB-IoT. In detail, example embodiments of the present invention provide methods for reperforming the random access by changing the coverage class (CC) or the coverage level (CL) when the random access process fails by the terminal up to the last step of the subcarrier spacing and/or multi-tone configuration provided in the coverage class (CC) or the coverage level (CL) after attempting retransmission by primarily changing subcarrier spacing and/or multi-tone configuration used in the coverage class (CC) or the coverage level (CL) when selecting a resource for preamble transmission while reperforming the random access when failing to transmitting a connection request message Message3 for uplink data transmission during the random access process.

According to example embodiments of the present invention, provided is an efficient random access method considering a coverage class (CC) or coverage level (CL) and an uplink subcarrier spacing and/or multi-tone configuration in a cellular based IoT system, for example, an NB-IoT.

Further, according to the example embodiments of the present invention, provided is a simplified data transmitting method that can reduce delay time and energy consumption of terminals which transmit small data in the cellular based IoT system.

In an aspect, a random access method, which is performed by the terminal, for uplink data transmission during a random access process between a cellular based machine communication terminal and a base station is provided. The method includes: performing the random access process between the cellular based machine communication terminal and the base station and the random access process includes selecting a random access resource by considering a coverage level and whether to support multi-tone transmission or not.

The selecting a random access resource by considering a coverage level and whether to support a multi-tone transmission or not may include selecting the random access resource by considering the selected coverage level and whether to support the multi-tone transmission or not when a message (Message3) is not yet transmitted, wherein the message (Message3) is a message for requesting a connection for the uplink data transmission by the machine communication terminal The selecting the random access resource by considering the selected coverage level and whether to support the multi-tone transmission or not when the message (Message3)—the message (Message3) being the message for requesting the connection for the uplink data transmission by the machine communication terminal—is not yet transmitted, may include selecting the random access resource that uses another subcarrier spacing and/or multi-tone configuration used in a coverage level equal to the selected coverage level, when a failure of HARQ transmission of the message (Message3) occurs consecutively or unsuccessful receipt of Contention Resolution occurs consecutively and thus a number of preamble transmission is more than a maximum number of preamble transmission.

The selecting the random access resource by considering the coverage level and whether to support multi-tone transmission or not may include selecting the random access resource corresponding to the selected coverage level and corresponding to the support of the multi-tone transmission when the message (Message3)—the message (Message3) being the message for requesting the connection for the uplink data transmission by the machine communication terminal—is not yet transmitted by the machine communication terminal.

In the selecting of the random access resource by considering the selected coverage level and whether to support the multi-tone transmission or not when the message (Message3)—the message (Message3) being the message for requesting the connection for the uplink data transmission by the machine communication terminal—is not yet transmitted by the machine communication terminal, the random access resource using the multi-tone configuration transmission used in the coverage level equal to the selected coverage level may be selected when the message (Message3) is not yet transmitted by the machine communication terminal.

The selecting of the random access resource by considering the selected coverage level and whether to support the multi-tone transmission or not when the message (Message3)—the message (Message3) being the message for requesting the connection for the uplink data transmission by the machine communication terminal—is not yet transmitted by the machine communication terminal may include performing the random access by changing the multi-tone configuration at the coverage level equal to the selected coverage level when the message (Message3) is not yet transmitted by the machine communication terminal.

In the selecting the random access resource by considering the selected coverage level and whether to support the multi-tone transmission or not when the message (Message3)—the message (Message3) being the message for requesting the connection for the uplink data transmission by the machine communication terminal—is not yet transmitted by the machine communication terminal, the base station may stepwise set the radon access resource by considering the coverage level and the subcarrier spacing and/or multi-tone configuration and the machine communication terminal may stepwise select the random access resource at the time of performing the random access when the message (Message3) is not yet transmitted by the machine communication terminal.

The performing of the random access by changing the subcarrier spacing and/or multi-tone configuration at the coverage level equal to the selected coverage level when the message (Message3)—the message (Message3) being the message for requesting the connection for the uplink data transmission by the machine communication terminal—is not yet transmitted by the machine communication terminal may include performing the random access by finally changing the selected coverage level when a last step of a combination of the subcarrier spacing and/or multi-tone configuration provided in the selected coverage level is failed after attempting the random access.

The coverage level may include normal coverage, robust coverage, and extreme coverage.

The random access process between the machine communication terminal and the base station may be applied to cellular based narrowband machine communication.

The machine communication terminal may include a Narrowband-Internet of Thing (NB-IoT) terminal capable of accessing a radio access network using a channel bandwidth of 180 kHz.

Whether to support the multi-tone transmission may be whether to support multi-tone Message 3 transmission or not. The random access process may further include selecting the coverage level by the machine communication terminal.

The case where the message (Message3)—the message (Message3) being the message for requesting the connection for the uplink data transmission by the machine communication terminal—is not yet transmitted may represent a case where first random access preamble transmission is performed by the machine communication terminal.

The random access process between the machine communication terminal and the base station may include transmitting, by the machine communication terminal, a random access preamble to the base station, receiving, by the machine communication terminal, a random access response (RAR) message from the machine communication terminal, transmitting, by the machine communication terminal, the message (Message 3) to the base station, the message (Message3) being the message for requesting the connection for the uplink data transmission by the machine communication terminal, and receiving, by the machine communication terminal, Contention Resolution for announcing that the Message 3 transmitted by the machine communication terminal is received by the base station.

In another aspect, a machine communication terminal performing a random access process for uplink data transmission with a base station using cellular based machine communication, may include a transceiver transmitting or receiving a radio frequency signal to or from the base station through an antenna, and a processor determining a time of transmitting the radio frequency signal by controlling the transceiver, wherein the processor may process a step of performing the random access process between the machine communication terminal and the base station, and wherein the random access process may include selecting a random access resource by considering a coverage level and whether to support multi-tone transmission or not.

In yet another aspect, a machine communication device performing a random access process for uplink data transmission with a base station for cellular based machine communication may include a transceiver transmitting or receiving a radio frequency signal to or from the base station through an antenna, and a processor may determine the time of transmitting the radio frequency signal by controlling the transceiver, wherein the processor may process performing the random access process between the machine communication device and the base station, and the random access process may include selecting a random access resource by considering a coverage level and whether to support multi-tone transmission.

In still yet another aspect, a random access method between a cellular based machine communication terminal and a base station may include receiving, by the base station, a random access preamble from the machine communication terminal, transmitting a random access response (RAR) message to the machine communication terminal, receiving, by the base station, a message (Message 3) from the machine communication terminal, wherein the message (Message3) is a message for requesting a connection for the uplink data transmission, and transmitting, by the base station, contention resolution (CR) to the machine communication terminal, wherein the contention resolution (CR) indicates that the Message 3 transmitted by the machine communication terminal is received by the base station, wherein, in the random access process, a random access resource may be selected by considering a coverage level and whether to support multi-tone transmission or not.

In still yet another aspect, a base station performing a random access process for uplink data transmission with a cellular based machine communication terminal may include a transceiver transmitting or receiving a radio frequency signal to or from the machine communication terminal through an antenna, and a processor determining the time of transmitting the radio frequency signal by controlling the transceiver, wherein the processor may process receiving a random access preamble from the machine communication terminal, transmitting a random access response (RAR) message to the machine communication terminal, receiving a message (Message 3) from the machine communication terminal, the message (Message3) being the message for requesting the connection for the uplink data transmission, and transmitting Contention Resolution to the machine communication terminal, wherein the contention resolution (CR) indicates that the Message 3 transmitted by the machine communication terminal is received by the base station, and wherein a random access resource, in the random access process, may be selected by considering a coverage level and whether to support multi-tone transmission or not.

In still yet another aspect, according to a small data transmission supporting method, the base station may broadcast system information (SI) or downlink control information (DCI) including a criterion for determining whether they are small data or not, and a terminal may determine whether they are the small data or not based on predefined criterion. Further, the base station may separately configure a random access channel for a small data transmitting terminal and a random access channel for a normal terminal and may transmit the DCI including resource allocation information for uplink/downlink transmission. Each terminal may transmit data having a predetermined size and operate in a sleep mode until data to be transmitted is generated. The small data transmission supporting method may be generally divided into a small data transmission request process and a small data transmission process of the terminal. When the terminal is initially powered on, the terminal may generate the data to be transmitted. The terminal may first perform synchronization with the base station for data transmission and receive the system information. The terminal may determine whether the small data may be transmitted or not through comparison with information included in the system information or a previously defined value after receiving the system information. When the small data may be transmitted, the terminal may perform the random access for requesting transmission of the small data and performs the small data transmission process by a method optimized to transmission of the small data after approving the request.

The present invention provides a method in which a terminal can perform an efficient random access process in response to a coverage class or coverage level, a subcarrier spacing configuration and/or a multi-tone configuration when a machine communication terminal or a machine communication device which operates in a cellular based IoT system perform a random access.

When a connection request message Message3 for performing uplink data transmission during the random access process is not yet transmitted, the machine communication terminal or the machine communication device may select a PRACH resource and a preamble by considering the coverage class (CC) or coverage level, the subcarrier spacing configuration, and/or whether to support multi-tone transmission or not, and the coverage class (CC) or coverage level introduced to support a wide coverage service may be additionally subdivided such that the machine communication terminal or the machine communication device may transmit data using optimal configuration. Further, the number of repetition may be increased, when the coverage class (CC) or coverage level is changed, by minimizing the change in coverage class (CC) or coverage level, and an operation time of the terminal, due to standing by up to PRACH resource corresponding to the coverage level, may be reduced to reduce energy consumption and to enhance delay time performance.

By the random access method for the uplink data transmission by the machine communication terminal or the machine communication device which operates in the cellular based IoT system according to example embodiments of the present invention, the machine communication terminal or the machine communication device can maximize utilization of the transmission methods which are subdivided depending upon the subcarrier spacing and/or multi-tone configuration within the coverage class or coverage level, and as a result, the increases in the operation time and the delay time at the machine communication terminal or the machine communication device can be alleviated by minimizing the change in coverage class or coverage level, thereby enhancing the performance of the energy consumption and the delay time.

Random access for uplink data retransmission can be simplified by efficiently using the subcarrier spacing and/or multi-tone transmission configuration of the machine communication terminal or the machine communication device to reduce the delay time and the energy consumption at the machine communication terminal or the machine communication device.

Further, example embodiments of the present invention may provide a transmission protocol which can enhance the operation of the terminal performing small data transmission in an IoT environment. The delay time and energy consumption at terminals that transmit small data in the cellular based IoT system can be reduced through small data transmitting methods provided by example embodiments of the present invention.

DESCRIPTION OF EXEMPLARY EMBODIMENTS

Figure 1:
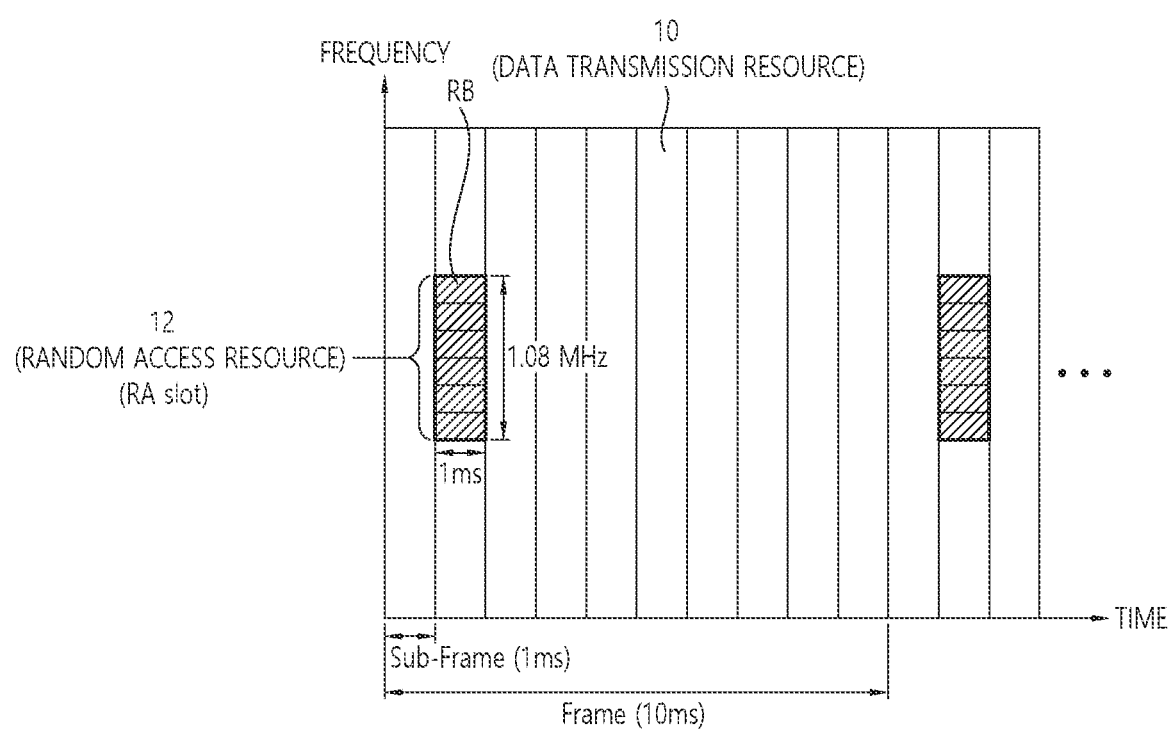
FIG. 1 is a conceptual view illustrating a PRACH resource configuration in a time-frequency domain in the existing LTE environment.

The present invention may have various modifications and various embodiments and specific embodiments will be illustrated in the drawings and described in detail.

However, this does not limit the present invention to specific embodiments, and it should be understood that the present invention covers all the modifications, equivalents and replacements included within the idea and technical scope of the present invention.

Terms such as first, second, and the like may be used to describe various components and the components should not be limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

A terminal may be referred to as a mobile station (MS), user equipment (UE), a user terminal (UT), a wireless terminal, an access terminal (AT), a fixed or mobile subscriber unit, a subscriber station (SS), a cellular phone, a wireless device, a wireless communication device, a wireless transmit/receive unit (WTRU), a mobile node, a mobile, a mobile station, a personal digital assistant (PDA), a smart phone, a laptop, a netbook, a personal computer, a wireless sensor, a consumer electronic device (CE), or other terms.

Various embodiments of the terminal may include the cellular phone, the smart phone having a wireless communication function, the personal digital assistant (PDA) having the wireless communication function, a wireless modem a portable computer having the wireless communication function, a photographing device such as a digital camera having the wireless communication function, a wearable device having the wireless communication function, a gaming device having the wireless communication function, music storing and playing home appliances having the wireless communication function, Internet home appliances capable of wireless Internet access and browsing, and portable units or terminals integrating combinations of the functions, but are not limited thereto. The base station generally represents a fixed point which communicates with the terminal and may generally include a base station, Node-B, eNode-B, an advanced base station (ABS), an HR-BS, a site controller, a base transceiver system (BTS), an access point (AP), or predetermined other type interfacing devices which may operate in a wireless environment, but is not limited thereto.

The base station may be a part of a RAN which may include other base stations and/or network elements (not illustrated) such as a base station controller (BSC), a radio network controller (RNC), relay nodes, and the like. The base station may be configured to transmit and/or receive radio signals in a specific geographical area which may be referred to as a cell (not illustrated).

The cell may also be partitioned into cell sectors. For example, the cell associated with the base station may be partitioned into 3 sectors. Therefore, in an example embodiment, the base station may include three transceivers, that is, one transceiver for each sector of the cell. In another example embodiment, the base station may use multiple-input multiple output (MIMO) technology, and as a result, the base station may use multiple transceivers for each sector of the cell.

Hereinafter, the terminal includes a machine communication terminal for implementing machine communication with a sensor and a communication function therein. For example, the machine communication terminal may include a machine type communication (MTC) terminal or a Narrow band Internet of Things (NB-IoT) terminal.

The Narrow band Internet of Things (NB-IoT) terminal represents a terminal capable of accessing a radio access network of a channel bandwidth with 180 kHz of NB-IoT which is a cellular based narrow band technology for implementing a low-power IoT network providing extended coverage in a licensed band. The corresponding narrow band width may operate in an in-band mode allocating and using some of resources in the existing LTE network, a guard-band mode using a protection frequency band, and a stand-alone mode using a portion within a GSM band.

Hereinafter, preferred example embodiments of the present invention will be described in detail with reference to the accompanying drawings. In describing the present invention, like reference numerals refer to like elements in the drawings for easy overall understanding and a duplicated description of like elements will be omitted.

In the case of the NB-IoT, 1 PRB is divided into 12 subcarriers in order to support an IoT service in a 200-kHz band of the existing GSM, and 1 PRB may be stretched by 6 times in a time domain (6:1 time stretch) instead of reducing the existing bandwidth by approximately ⅙ ratio. The NB-IoT may have a plurality of coverage levels or coverage classes and the coverage level or coverage class may be classified into three types of normal coverage (144 dB MCL), robust coverage (154 dB MCL), and extreme coverage (164 dB MCL).

NB-PRACH uplink transmission may be performed by frequency hopping together with single-tone transmission which may guarantee performance and provide low power and low complexity in an extreme coverage environment.

NB-PRACH uses 3.75 kHz subcarrier spacing for the single-tone transmission, and 3.75 kHz subcarrier spacing can provide more preambles and more enhanced performance in the extreme coverage environment than 15 kHz such that 3.75 kHz subcarrier spacing may support a maximum cell size of 40 km.

Further, in the NB-PRACH, the length of two cyclic prefixes (CPs) may be provided in order to support different cell sizes.

NB-PRACH repetition transmission is a method that configures NB-PRACH resources for supporting NB-IoT terminals which belong to different coverage classes. The terminals may operate by selecting the NB-PRACH having appropriate repetition transmission according to the coverage class.

The NB-PRACH repetition transmission may be provided at a predetermined number in a predetermined set (1, 2, 4, 8, 16, 32, 64, and 128) and the eNB may be configured to perform a maximum of three types of NB-PRACH repetition transmission from the predetermined set by considering three coverage classes.

With regard to power ramping of the NB-PRACH, when one or more repetition levels are configured in a cell, the terminal transmits the NB-PRACH with the maximum power except for a lowest repetition level having a highest coverage class, and in other cases, the terminal transmits the NB-PRACH by using the power ramping to implement a low-power operation.

The NB-IoT terminal may fail to receiving Msg4 after RAR is received and Msg3 is transmitted during the random access process. In this case, the terminal repeatedly retransmits the Msg3 and when the terminal fails to consecutively receiving the Msg4 at a predetermined number of times, the terminal determines that the coverage classes does not coincide with each other and changes the coverage class. The number of retransmission until the coverage class is changed may be indicated in downlink control information (DCI) in an NB-PDCCH.

Hereinafter, an NPRACH may be used as the same as the NB-PRACH.

In the NB-IoT, the 3.75 kHz and 15 kHz subcarrier spacings may be used during the uplink (UL) transmission.

With regard to a UL grant, uplink (UL) subcarrier spacing may have 3.75 kHz or 15 kHz, and 3.75 kHz or 15 kHz may be indicated as 1 bit information to be included in the UL grant of the RAR message. That is, in the NB-IoT, whether which subcarrier spacing among 3.75 kHz or 15 kHz is used may be indicated by using 1 bit in the UL grant (uplink grant) of the RAR message transmitted by the base station.

In the NB-IoT, two subcarrier spacings such as 3.75 kHz and 15 kHz may be used in detail during the random access process via the RAR message.

With regard to NB-PRACH subcarrier locations, a frequency location in a subcarrier offset may have 7 values, for example, 0, 12, 24, 36, 2, 18, and 34 and may be represented by 3 bits.

The number of subcarriers may have 4 values, for example, 12, 24, 36, and 48 and may be represented by 2 bits.

The NB-PRACH may be repeated by using contiguous subframes within one period. In detail, NB-PRACH repetitions may be transmitted consecutively (transmitted back to back) within contiguous subframes within one period for the NB-PRACH.

With regard to the NB-PRACH subcarrier locations, the frequency location in the subcarrier offset may vary depending on the number (for example, 12, 24, 36, and 48) of subcarriers. In detail, the frequency location in the subcarrier offset may vary such as 0, 12, 24, 36, 2, 18, and 34 depending on the number (for example, 12, 24, 36, and 48) of subcarriers, and the number of subcarriers and the frequency location in the subcarrier offset may be predefined in a predetermined table.

With regard to the NB-PRACH, adjustment of the uplink transmission timing may be applied from the start of first NB-PUSCH transmission which starts at a predetermined time, for example, 12 ms, after transmission of a corresponding timing advance command terminates. Herein, the timing advance command may be included in the RAR to be transmitted via the RAR.

In the NB-IoT, with regard to the NB-PRACH configuration, a maximum of 3 NB-PRACH resource configurations may be used in one cell.

Figure 9:
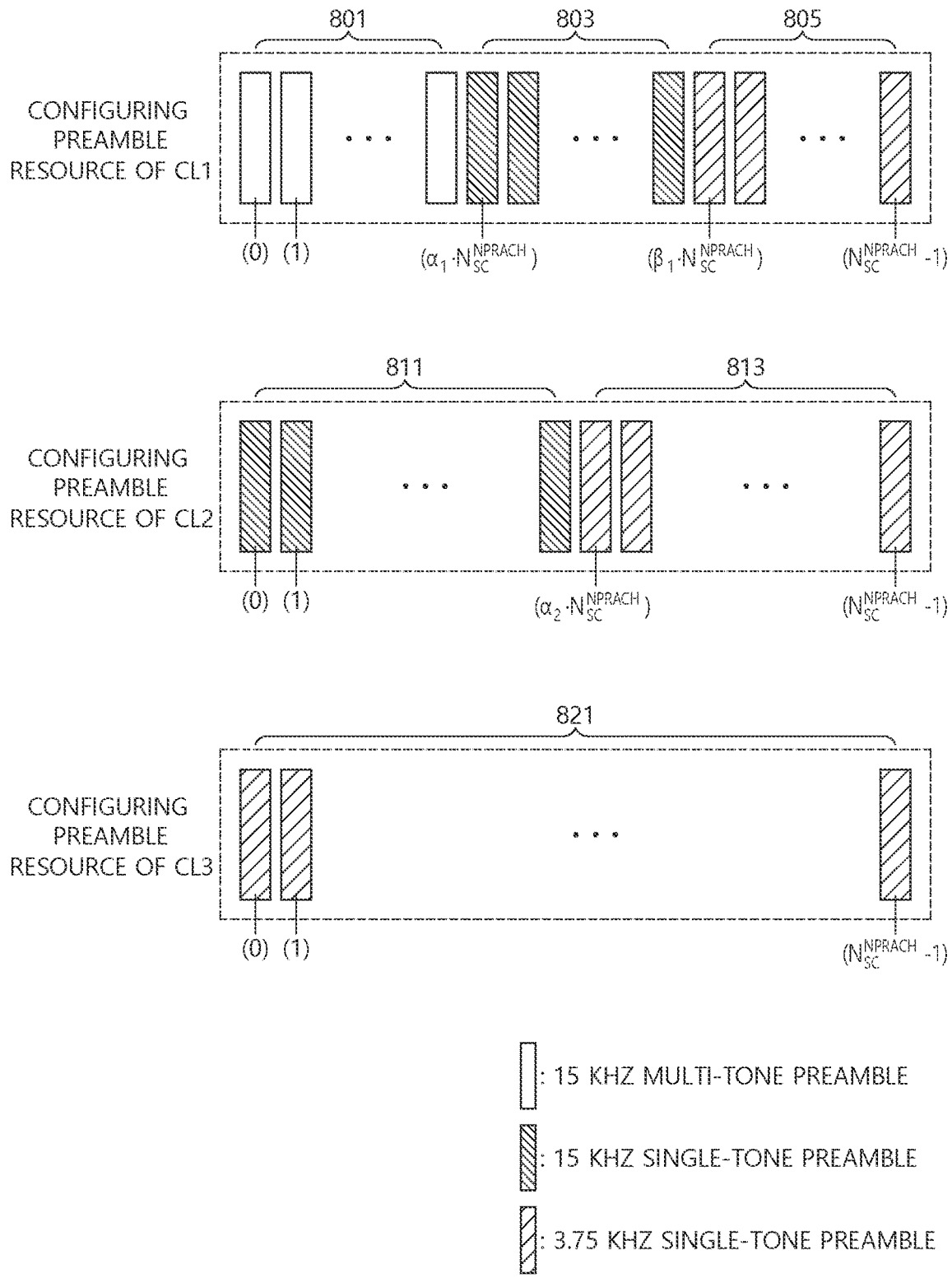
FIG. 9 is a diagram illustrating an example of a PRACH preamble resource configuration for each coverage level of FIG. 8.

The PRACH resources may be divisionally used for the single-tone and multi-tone transmission. In particular, the PRACH subcarrier may be divisionally used for the single-tone and multi-tone transmission in the PRACH configuration depending on the coverage level presented in FIG. 9.

When the terminal performs an RACH procedure in order to transmit the Msg3 through the single tone and the multi-tone, the terminal may divide the subcarrier resources to be used in the PRACH according to the single-tone transmission or the multi-tone transmission. In detail, the subcarrier for the single-tone transmission may be particularly guaranteed (may not be 0) in a specific PRACH resource. For example, a ratio of the number of subcarriers to be used for the single tone MSG3 transmission may not become 0 in at least one resource in which the number of NB-PRACH repetition is other than 32, 64, and 128. Alternatively, the ratio of the number of subcarriers to be used for the single tone MSG3 transmission may not become 0 at least in resource in which the number of NB-PRACH repetition is 32, 64, 128.

The multi-tone MSG3 transmission may not be supported when the number of NB-PRACH repetition is 32, 64, 128.

A range of the subcarrier resource used for the multi-tone transmission may be expressed by using 2 bits. For example, a starting subcarrier index in a subcarrier range reserved for UE which supports the multi-tone Msg transmission may be expressed through, for example, 2 bits ($\{0, \frac{1}{3}, \frac{2}{3}, 1\} \times N\_sc^{NB\text{-}PRACH}$). Herein, $N\_sc^{NB\text{-}PRACH}$ represents the total number of subcarriers and $\frac{1}{3} \times N\_sc^{NB\text{-}PRACH}$ means $\frac{1}{3}$ of the total subcarrier number.

Further, when there is no subcarrier resource for the multi-tone Msg3 transmission, the subcarrier for the single-tone Msg3 transmission may be used. When the UE selects the resource reserved for the single tone MSG3 message, the MSG3 message may be allocated to the single tone. This means that the UE needs to use the NB-PRACH resources reserved for the single tone MSG3 transmission when a reserved subcarrier range, which is used by the UE that all PRACH resources support the multi-tone MSG3 transmission, does not exist.

In the NB-PRACH resource, other subcarriers (subcarriers other than the subcarrier to be used in the multi-tone transmission) may be used as a range for the single tone MSG3 transmission.

Msg3 message subcarrier allocation may be the same as UL grant allocation on the NB-PDCCH.

The Msg3 repetition number may be the same as the NB-PUSCH repetition number.

From the viewpoint of a technical effect, since the 3.75 kHz subcarrier spacing is relatively excellent in power spectral density (PSD) performance, the 3.75 kHz subcarrier spacing may operate robustly even in an environment in which the channel state is not good, the 15 kHz subcarrier spacing may enhance uplink transmission rate of the terminal through a relatively wide bandwidth, but the 15 kHz subcarrier spacing needs to be used in the good channel state. Therefore, two subcarrier spacings such as 3.75 kHz and 15 kHz may be provided to be suitable for the channel state of the terminal, thereby leading to performance enhancement. The multi-tone transmission may enhance the transmission rate as compared with the single-tone transmission by using multiple subcarriers.

An equation given below, which is used in RAN1 may be reused for the power ramping in the NB-PRACH. However, a term (−10*log 10(numRepetitionPerPreambleAttempt) is added and a repetition transmission effect may be compensated through the added term.

REAMBLE_RECEIVED_TARGET_POWER is defined as preambleInitialReceivedTargetPower+DELTA_PREAMBLE+(PREAMBLE_TRANSMISSION_COUNTER−1)*powerRampingStep−10*log 10(numRepetitionPerPreambleAttempt), and in this case, DELTA_PREAMBLE is 0.

In case of colliding transmissions, with respect to a standalone operation and a guard band operation, NB-IoT channels and signals other than an NB-PBCH may occupy resource elements (REs) corresponding to LTE cell-specific reference signals (CRS) calculated according to physical Cell_ID. NB-IoT signaling of LTE channel state information-reference signals (CSI-RS) or positioning reference signals (PRS) does not exist. The NB-PDCCH and the NB-PDSCH may be rate-matched to the periphery of the LTE cell-specific reference signals (CRS) for an in-band operation.

With regard to a scheduling collision, the NB-IoT UE that receives the grant from the NB-PDCCH need not additionally monitor the NB-PDCCH for a predetermined DL grant or UL grant during a time period between the start of the corresponding NB-PDSCH or NB-PUSCH transmission and the end of the NB-PDCCH scheduling the grant.

With regard to PRACH collision handling for the NB-IoT, UEs in lower coverage may treat NB-PRACH opportunities collision with higher coverage level(s) as invalid. The UEs may use only NB-PRACH opportunities valid for Msg1 transmission.

In long term evolution (LTE), the terminal may start the random access process when a link configuration or reconfiguration with the base station eNodeB (eNB) for data transmission. The random access may operate according to a non-contention scheme or a contention scheme according to the purpose.

The non-contention scheme random access process is used only for a special purpose such as handover and in a normal case, the terminal configures a connection with the eNB through the contention scheme random access to transmit data.

FIG. 1 is a conceptual view illustrating a PRACH resource configuration in a time-frequency domain in the existing LTE environment.

Referring to FIG. 1, a resource that performs a random access includes a continuous time-frequency random access resource 12 called a random access (RA) slot and the terminal transmits a preamble in an RA slot to start a transmission request.

The resource in which the preamble is transmitted is referred to as a physical random access channel (PRACH) and is used while being allocated to a predetermined part of a physical uplink shared channel (PUSCH). As illustrated in FIG. 1, in a frequency domain, a PRACH resource has a bandwidth corresponding to 6 resource blocks (RBs).

Each cell provides 64 preambles and some of the preambles are reserved to support the non-contention scheme random access and the residual preamble resources are classified into resources of Group A and Group B. Group A is used for transmitting a small packet and Group B is used for transmitting a large packet. Besides, random access related parameters including periodicity of the RA slot, the number of preambles used in the contention based random access, a message size maximally permitted in Group A, and the like are transferred to the terminal through a system information block 2 (SIB 2) message.

A reduced 180-kHz band may be allocated and used in the case of uplink and random access transmission of Narrow Band-Internet of Thing (NB-IoT) and the NB-IoT uplink and random access transmission may be divided into single-tone transmission using a single subcarrier and multi-tone transmission using multiple subcarriers.

Figure 2:
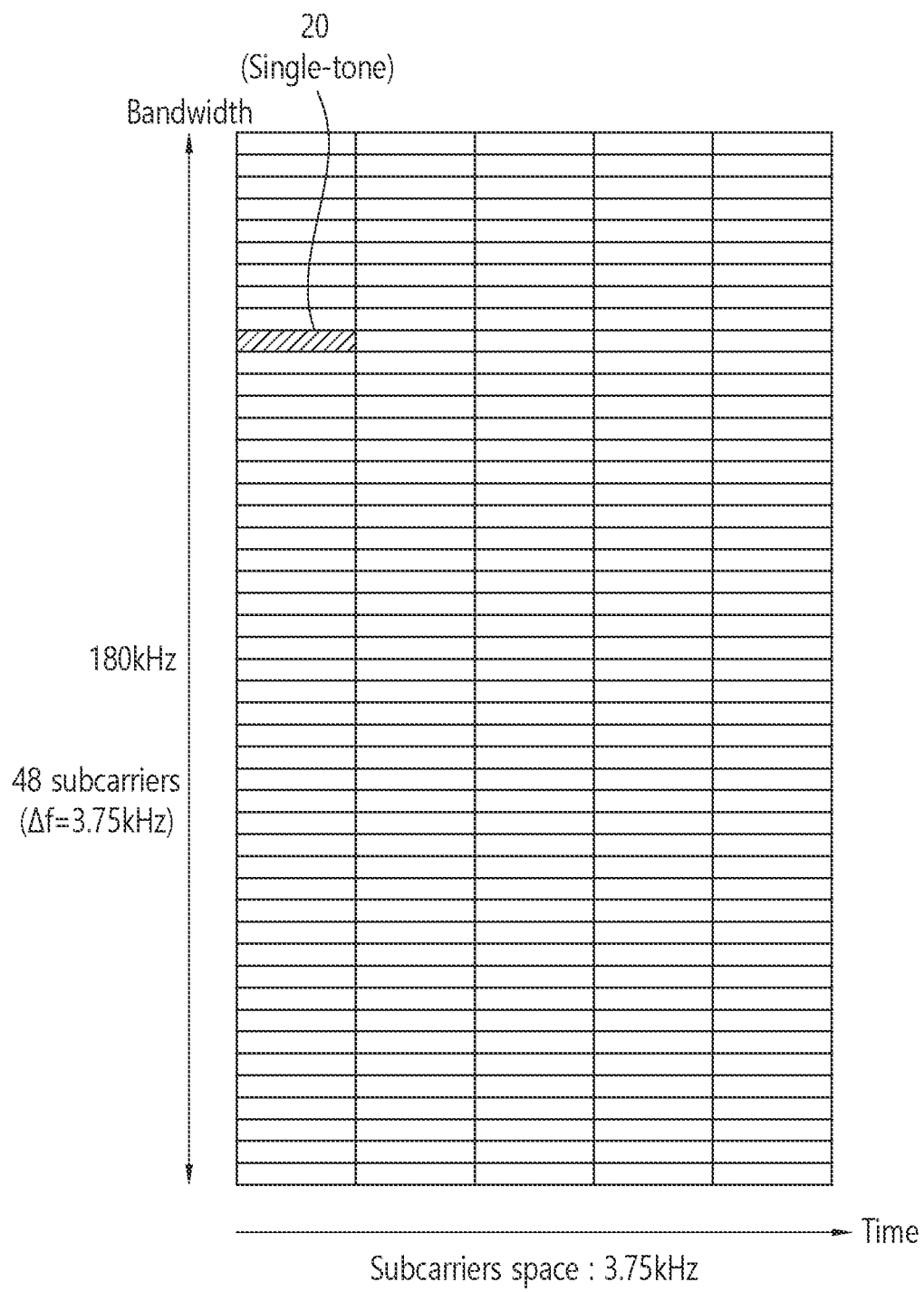
FIG. 2 is a conceptual view for describing uplink single-tone transmission when 3.75 kHz subcarrier spacing is used in Narrow band-Internet of Things (NB-IoT).
Figure 3:
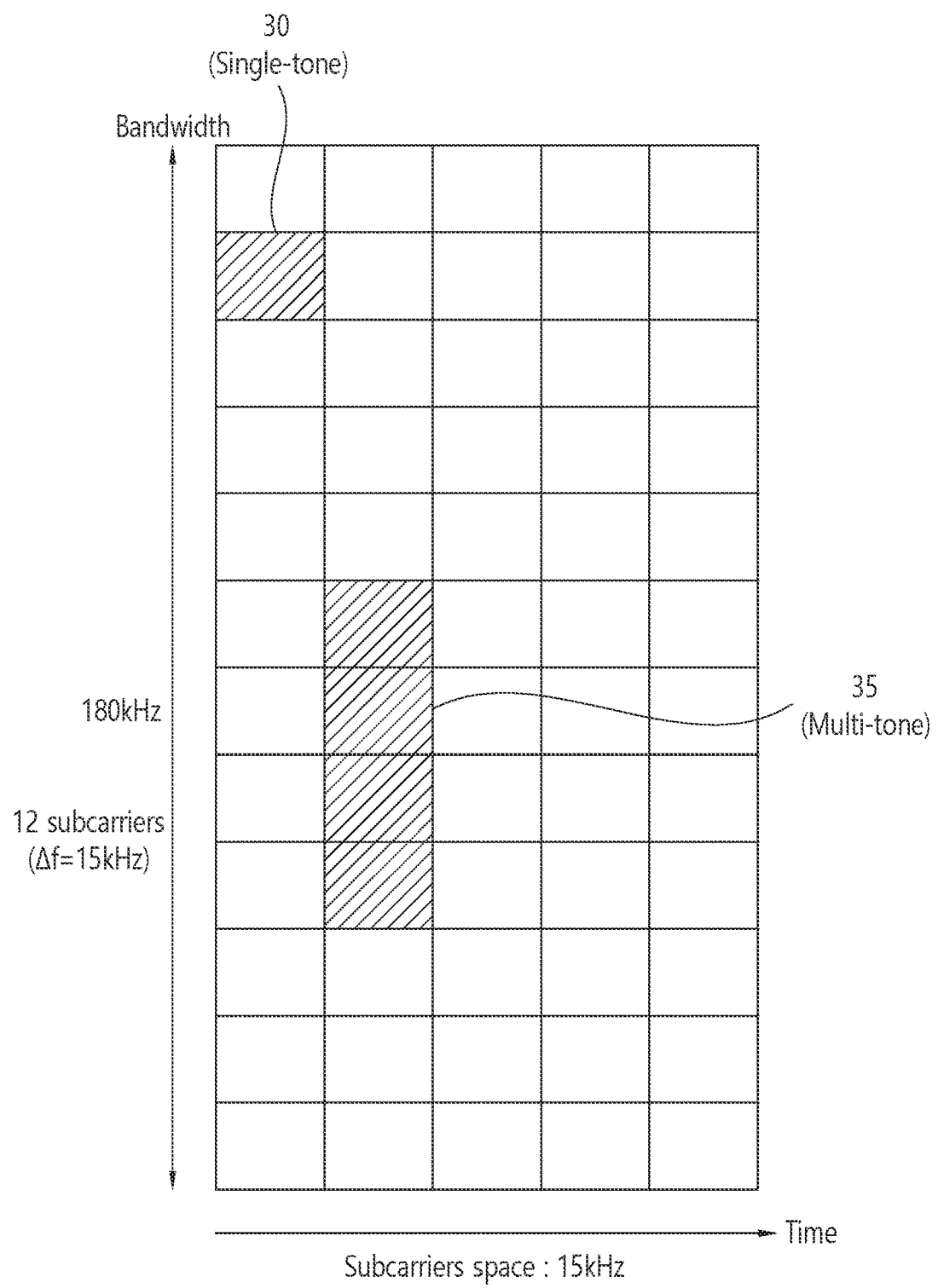
FIG. 3 is a conceptual view for describing uplink single-tone transmission or multi-tone transmission when the 15 kHz subcarrier spacing is used in the Narrow band-Internet of Things (NB-IoT).

FIG. 2 is a conceptual view for describing uplink single-tone transmission when 3.75 kHz subcarrier spacing is used in Narrow band-Internet of Things (NB-IoT) and FIG. 3 is a conceptual view for describing uplink single-tone transmission or multi-tone transmission when the 15 kHz subcarrier spacing is used in the Narrow band-Internet of Things (NB-IoT).

In the case of the single-tone transmission, single-tone transmission 20 using the 3.75 kHz subcarrier spacing as illustrated in FIG. 2 or single-tone transmission 30 using the 15 kHz subcarrier spacing as illustrated in FIG. 3 is available. In the case of the single-tone transmission, the data rate is low by using a small frequency band, but power concentrates on the frequency band, and as a result, coverage efficiency is high even in the environment in which the channel state is not good and device cost and device complexity may be reduced as compared with the multi-tone transmission scheme.

In the case of the multi-tone transmission, the terminal may perform multi-tone transmission 35 using the 15 kHz subcarrier spacing illustrated as illustrated in FIG. 3. In the case of the multi-tone transmission, the high data rate is guaranteed by using multiple subcarriers, but a comparatively wide bandwidth is used, and as a result, the multi-tone transmission needs to be under the environment in which the channel state is good and the device cost may increase and the device complexity may increase due to the increased signal processing.

Figure 4:
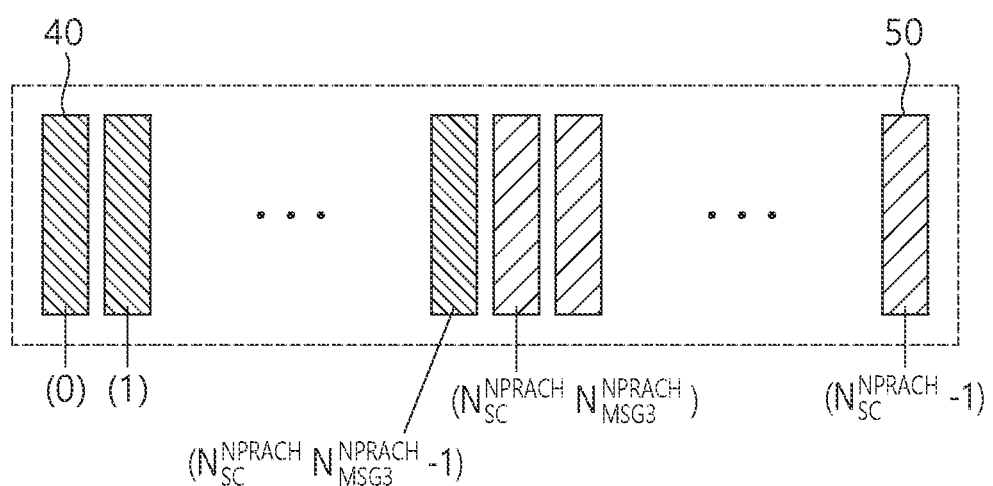
FIG. 4 is a conceptual view illustrating a PRACH resource configuration including a single-tone preamble and a multi-tone preamble.

FIG. 4 is a conceptual view illustrating a PRACH resource configuration including preambles for single-tone and multi-tone Msg3 transmission in the NB-IoT system.

Referring to FIG. 4, the PRACH resource may be constituted by a single-tone preamble 40 numbered with 0, 1, . . . , ($N_{sc}^{NPRACH}$ $N_{MSG3}^{NPRACH}$−1) and a multi-tone preamble 50 numbered with ($N_{sc}^{NPRACH}$ $N_{MSG3}^{NPRACH}$), . . . , ($N_{sc}^{NPRACH}$−1).

Besides, the PRACH resource may be defined as the following parameters transmitted from the base station the terminal.

$N_{period}^{NPRACH}$: NPRACH resource periodicity)
$N_{scoffset}^{NPRACH}$: Frequency location of the first sub-carrier allocated to NPRACH
$N_{sc}^{NPRACH}$: The number of sub-carriers allocated to NPRACH)
$N_{rep}^{NPRACH}$: The number of NPRACH repetition per attempt
$N_{start}^{NPRACH}$: NPRACH starting time
$N_{MSG3}^{NPRACH}$: Fraction for calculating starting subcarrier index for the range of NPRACH subcarriers reserved for indication of UE support for multi-tone msg3 transmission Hereinafter, the contention based random access process will be described with reference to FIGS. 5 and 6.

Figure 5:
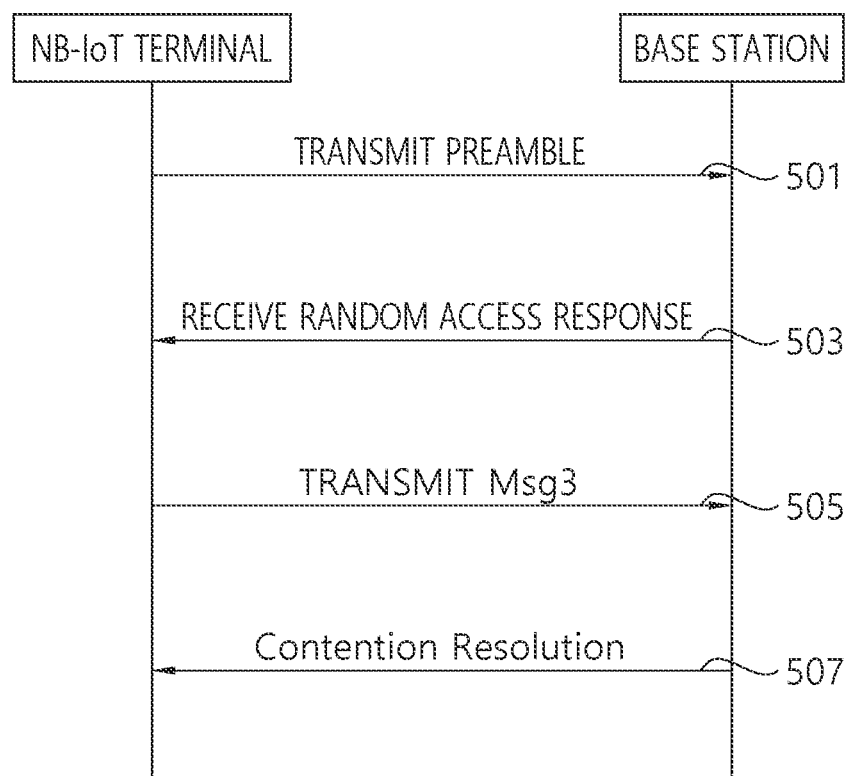
FIG. 5 is a flowchart for describing a random access process between a machine communication terminal and a base station in cellular based narrowband machine communication according to an example embodiment of the present invention.
Figure 6:
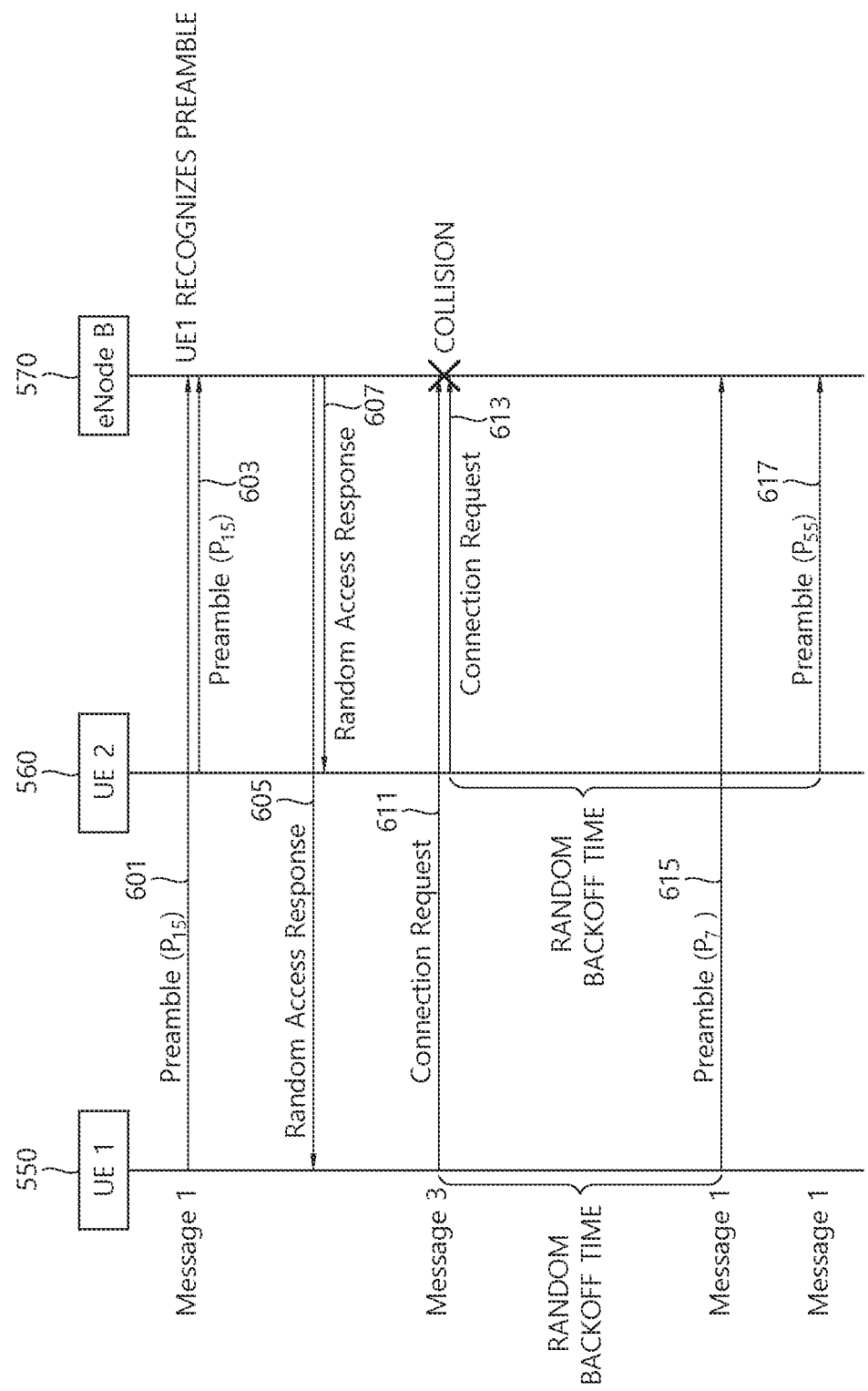
FIG. 6 is a flowchart for describing a Message 3 collision by selection the same preamble by a terminal during a random access operation.

FIG. 5 is a flowchart for describing a random access process between a machine communication terminal and a base station in cellular based narrowband machine communication according to an example embodiment of the present invention and FIG. 6 is a flowchart for describing a Message 3 collision by selection the same preamble by a terminal during a random access operation.

1. Message 1 Transmission [Preamble Transmission]

Referring to FIG. 5, the NB-IoT terminal starts the random access and transmits the preamble to the station (step 501). In this case, the terminal randomly selects one preamble in the resource corresponding to the coverage level and transmits the selected preamble to the base station. Different preambles transmitted to the base station may be received by the base station by orthogonality between the preambles.

As another case, referring to FIG. 6, even when two or more terminals UE 1 550 and UE 2 560 simultaneously transmit the same preamble, the same preambles are the same signal, and as a result, the base station may receive the preamble (steps 601 and 603). However, when two or more terminals select the same preamble, the collision may occur during the subsequent Message 3 transmission process of the terminal.

2. Message 2 Transmission [Random Access Response Transmission]

The base station transmits the random access response (RAR) message including resource information for timing alignment (TA) and transmission of the Message3 to the terminal through a physical downlink shared channel (PDSCH) in response to a preamble request which was successfully received by the base station. The resource information for timing alignment (TA) and transmission of the Message3 may be, for example, a physical uplink shared channel (PUSCH) resource. The terminal may determine whether the preamble, which the terminal previously receives, is successfully received or not by receiving the RAR message. When it is determined that the terminal unsuccessfully transmits the preamble, the terminal transmits the preamble in order to reperform the random access process in a new RA slot after a random backoff time. When the transmission failure of the preamble occurs more than a predetermined number of times, the terminal informs a problem in the random access process to a higher layer.

3. Message 3 [Connection Request Transmission]

The terminal transmits the Message3, which represents a connection request, via a reserved resource in the physical uplink shared channel (PUSCH) after receiving the random access response (RAR) (505). The Message 3 is transmitted by an HARQ scheme. As described in the Message 1 transmitting step, referring to FIG. 6, when a plurality of terminals transmits the same preamble (steps 601 and 603) and the base station thus transmits the random access response (RAR) (steps 605 and 607), the plurality of terminals transmits the Message 3 via the same PUSCH resource (steps 611 and 613), and as a result, the collision occurs.

Herein, the Message 3 (Msg3) is a message by which the terminal perform the connection request to the base station for uplink data transmission. The terminal may perform uplink transmission in the allocated resource when receiving a Contention Resolution, which is a response from the base station, after transmitting the Message 3.

When the terminal initially transmits the preamble, it is determined that the Msg3 is not yet transmitted, the terminal selects and transmits the preamble in the PRACH resource corresponding to the coverage level determined by the terminal. Alternatively, when the terminal transmits the preamble second time or more due to a failure in transmission of the Msg3, it is determined that the Msg3 is under retransmission, and the terminal attempts the random access by randomly selecting the preamble again in a resource in which a first preamble is selected. When the number of preamble transmission is more than the maximum number of preamble transmission, the coverage level is changed and the number of preamble transmission is again initialized to 1.

4. Message 4 [Contention Resolution Transmission]

The base station that receives the Message 3 from the terminal responds to the terminal using the contention resolution (CR) included in the physical uplink shared channel (PDSCH) and approves the connection request to the terminal (step 507). In FIG. 6, the Message 3 collision of two terminals occurs (step 611 or 613). In this case, the terminal may not receive the contention resolution (CR) from the base station and transmits a new preamble in the new RA slot after the random backoff time. When the transmission failure of the preamble occurs more than a specific number of times, the terminal determines that it is impossible to use a network.

Figure 7:
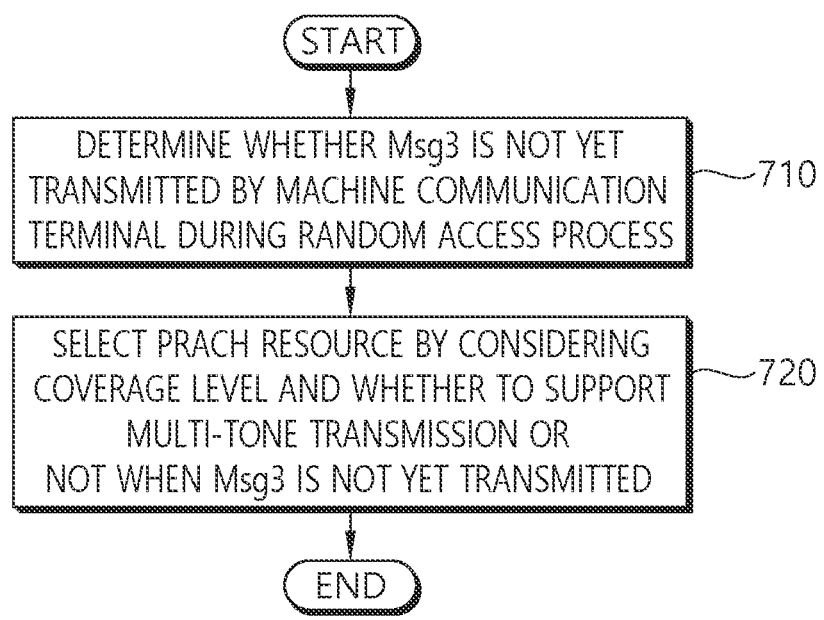
FIG. 7 is a flowchart for describing an operation when Message 3 is not yet transmitted in FIG. 6.

FIG. 7 is a flowchart for describing a random access operation when Message 3 is not yet transmitted in FIG. 6.

Referring to FIG. 7, the machine communication terminal determines whether the Message 3 (Msg3) is not yet transmitted during the random access process (step 710). In this case, a state in which the Msg3 is not yet transmitted represents a case where the first preamble is transmitted.

As the determination result, when the Message 3 (Msg3) is not yet transmitted, the PRACH resource is selected by considering the coverage level and whether to support the multi-tone transmission or not (step 720). Alternatively, as the determination result, when the Message 3 (Msg3) is not yet transmitted, the PRACH resource may be selected by considering the coverage level, the subcarrier spacing and/or whether to support the multi-tone transmission or not. In detail, the case where the Message 3 (Msg3) is not yet transmitted represents a case where the random access process is initialized and the first preamble is transmitted, and the PRACH resource may be selected by considering the coverage level and whether to support the multi-tone Message 3 (Msg3) transmission or not. In detail, the case where the Message 3 (Msg3) is not yet transmitted represents a case where the number of preamble transmission is initialized due to exceeding the maximum number of preamble transmission and thereafter, the first preamble is transmitted under other conditions by the machine communication terminal, or a case where first random access preamble transmission is performed without exceeding the maximum number of preamble transmission.

Figure 8:
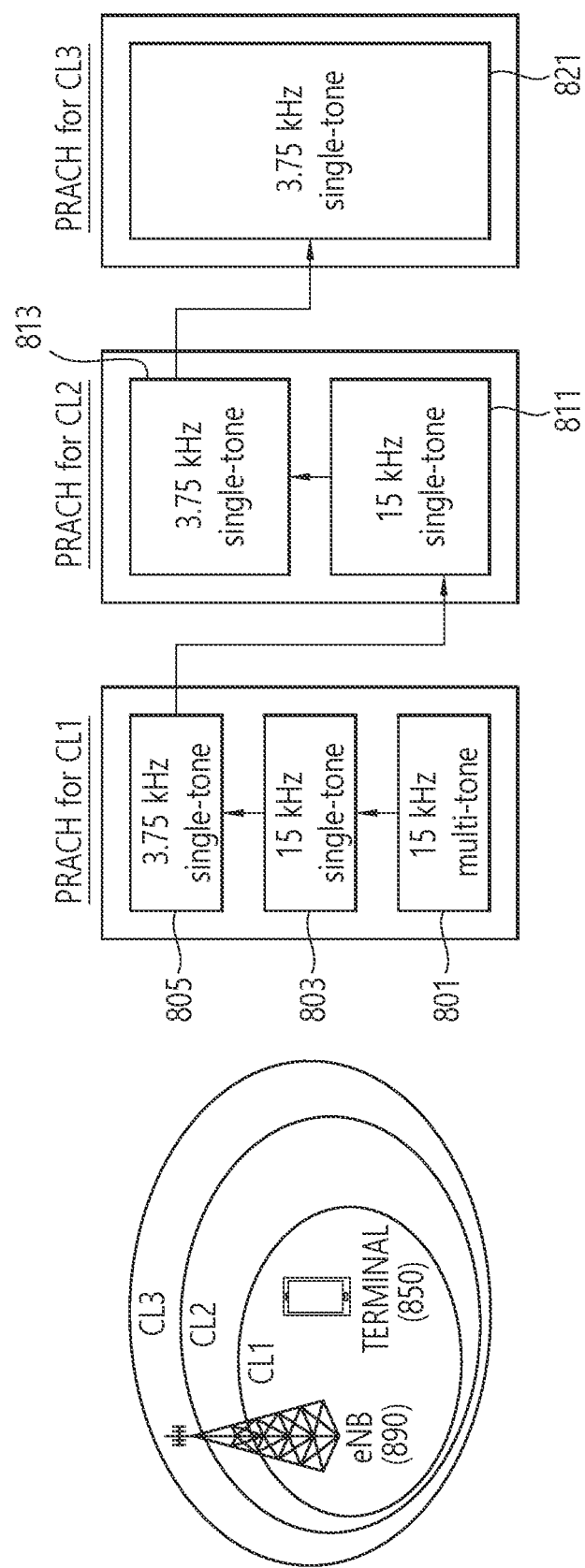
FIG. 8 is a conceptual view illustrating the situation of using PRACH resources and the order of using PRACH resources depending on a base station environment and a coverage level according to an example embodiment of the present invention.

FIG. 8 is a conceptual view illustrating a PRACH resource use situation depending on a base station environment and a coverage level according to an example embodiment of the present invention.

The present invention provides a random access performing method considering the coverage level (CL) and the subcarrier spacing and/or the multi-tone configuration in the cellular based IoT system, for example, the NB-IoT system.

Referring to FIG. 8, in the example embodiment of the present invention, a base station 880 provides three coverage levels (CLs), and, for each coverage level (CL), configures the resources so as to use the PRACH resources by dividing the PRACH resources according to the subcarrier spacing and/or multi-tone configuration. However, this is just one of example embodiments of the resource configuration in the present invention according to the performance characteristic of the subcarrier spacing and/or multi-tone configuration and a specific configuration combination may be excluded or added. An example embodiments of the present invention will be described in a direction to maximally use sequential performance according to the subcarrier spacing and/or multi-tone configuration.

Referring to FIG. 8 and Table 1, the terminal may use three subcarrier combination configurations of 1) 15 kHz, multi-tone, 2) 15 kHz, single-tone, and 3) 3.75 kHz, single-tone according to the channel state, for example, channel state at a cell center, a good channel state, and an extreme coverage state.

Further, in response thereto, the base station may divide even the preamble resources according to a set value which is specifically supported according to each coverage level. In this case, the range of the preamble resource may be determined according to α, β, and the like and the corresponding information is included in a message representing information constituting the PRACH resource to be transferred from the base station to the terminal similarly to the related art. It is assumed that since CL1 has a best channel state, the CL1 uses all of three subcarrier and/or multi-tone configurations, since CC2 has a relatively better channel state, the CC2 uses two subcarrier and/or multi-tone configuration of 2) 15 kHz, single-tone and 3) 3.75 kHz, single tone, and since CC3 has an extreme channel state, the CC3 uses only one subcarrier and/or multi-tone configuration of 3.75 kHz, single tone.

In the example embodiment of FIG. 8, the preamble resources of the CL1 are partitioned by using a ratio value of $\alpha_1$ and $\beta_1$ in order to partition the respective preamble resources of the CL1 into the (15 kHz, multi-tone), (15 kHz, single-tone), and (3.75 kHz, single-tone) resources and a ratio value of $\alpha_2$ is used in order to partition the respective preamble resources of the CL2 into the (15 kHz, single-tone) and (3.75 kHz, single-tone) resources.

The terminal performs synchronization with the base station for the uplink data transmission and receives system information from the base station while being synchronized with the base station and during this process, the terminal determines the CL and the subcarrier spacing and/or multi-tone configuration according to the channel state. Thereafter, the terminal receives PRACH resource information from the base station in order to perform the random access at the corresponding CL. During the random access process, the terminal selects the preamble by considering the selected CL and subcarrier spacing and/or multi-tone configuration and transmits the selected preamble to the base station. Thereafter, the terminal receives the resource information which may be used for transmitting the Msg3 to request the connection for the uplink transmission by receiving the random access response (RAR) from the base station. When the terminal may not receive the RAR, the terminal transmits the preamble again and selects and transmits the preamble in the same PRACH resource as the first selected configuration. When the number of retransmission is more than the maximum number of preamble retransmission times, the terminal changes the coverage level and thereafter, selects and transmits the preamble in the PRACH resource corresponding to the subcarrier spacing and/or multi-tone configuration available at the corresponding coverage level.

The terminal transmits the Msg3 in the allocated resource by the HARQ scheme and when the terminal fails to the HARQ transmission due to the change in channel state or when the terminal may not receive Msg4 even after transmitting the Msg3, the terminal transmits the preamble again and selects and transmits the preamble in the same PRACH resource as the first selected configuration. When the number of retransmission is more than the maximum number of preamble retransmission, the terminal changes the coverage level and the subcarrier spacing and/or multi-tone configuration and thereafter, selects and transmits the preamble in the corresponding PRACH resource.

In respect to all cases, when there is no subcarrier spacing and/or multi-tone configuration selectable with respect to the corresponding CL, the terminal selects the CL that supports a channel state lower by one step than current channel state, and thereafter, selects the subcarrier and/or multi-tone configuration corresponding thereto and selects the preamble resource to be transmitted in the corresponding PRACH resource.

Figure 10:
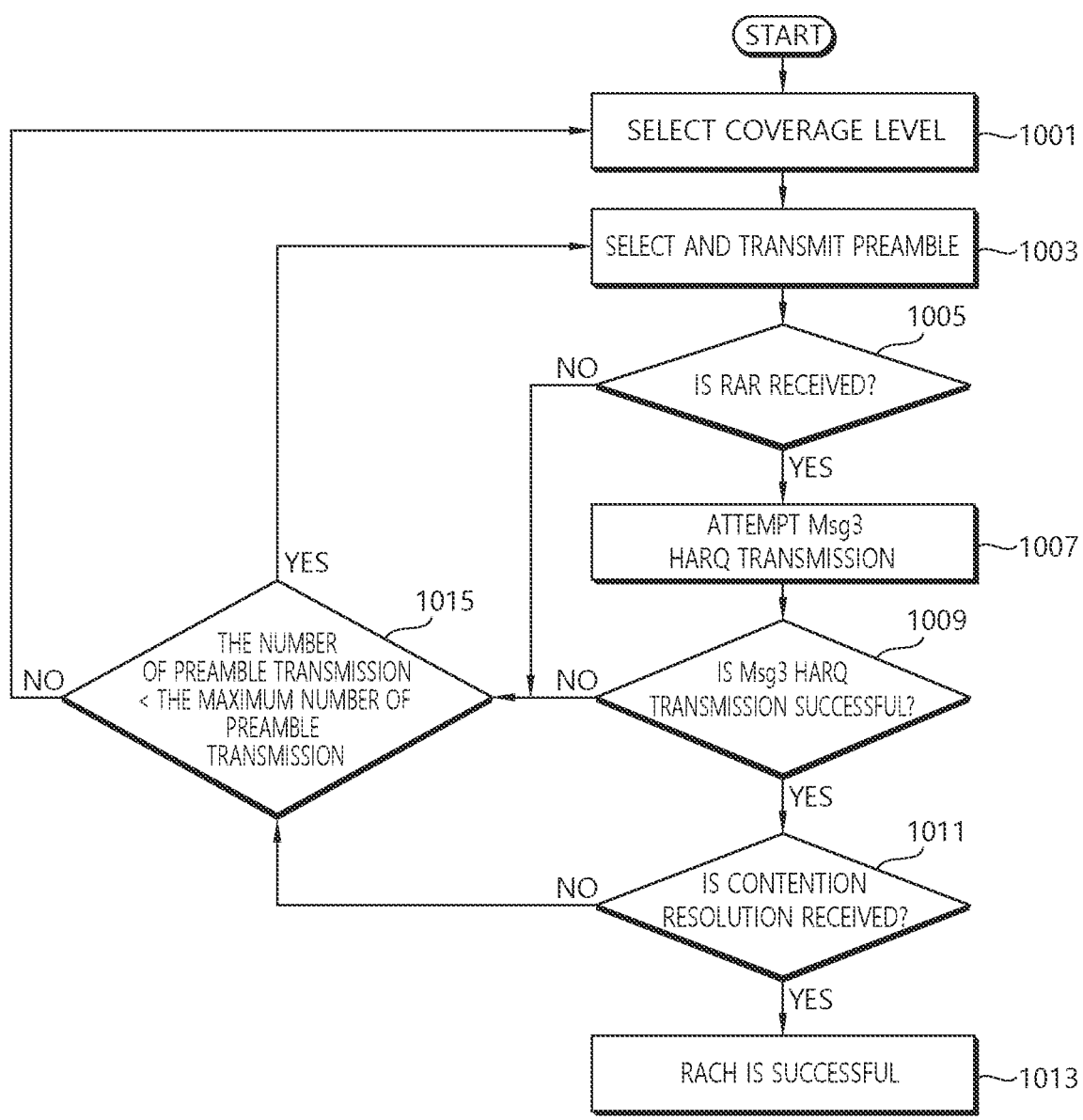
FIG. 10 is a flowchart illustrating a random access method for uplink data transmission considering a coverage level.
Figure 11:
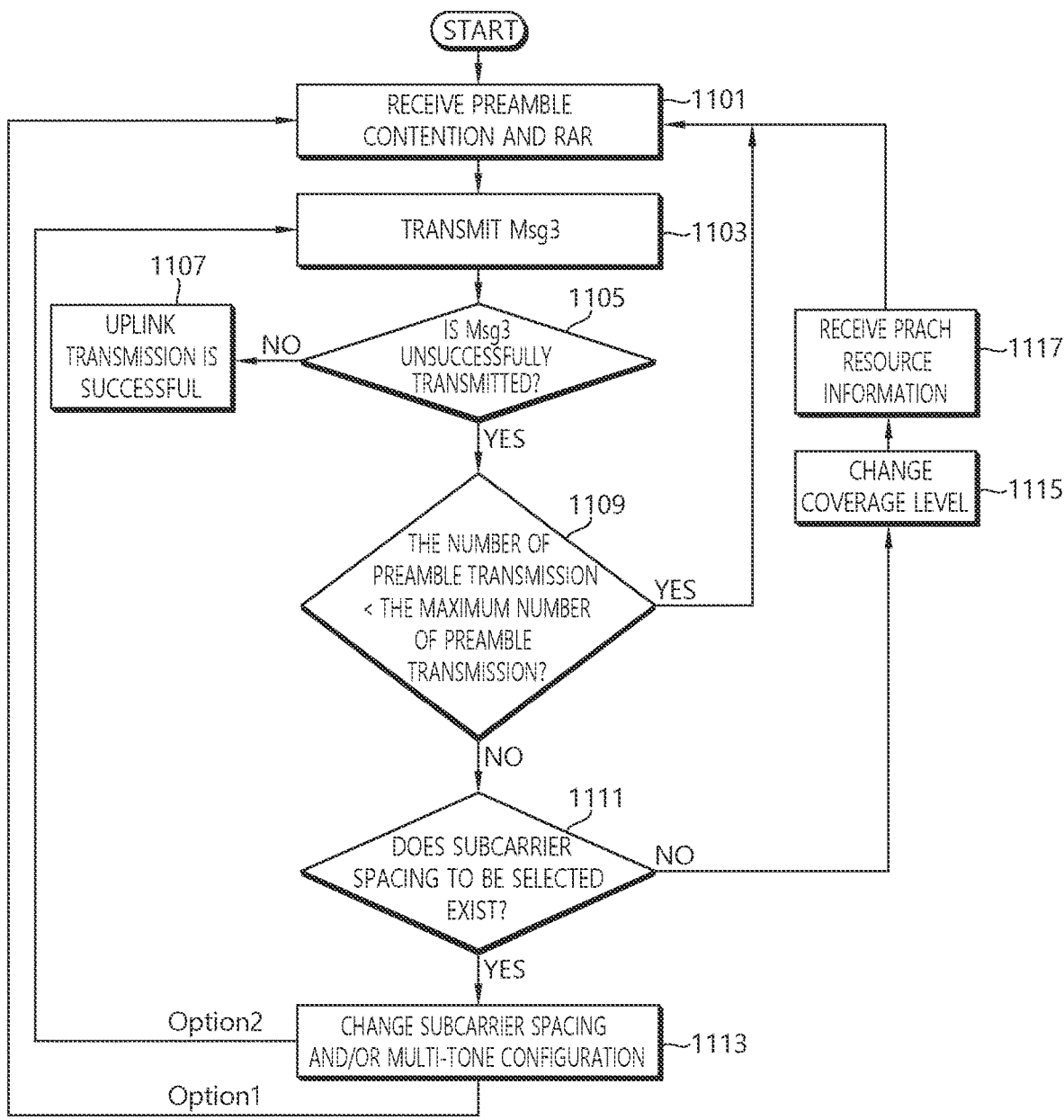
FIG. 11 is a flowchart illustrating a random access method for uplink data transmission of a terminal considering a coverage level and a subcarrier spacing and/or multi-tone configuration according to an example embodiment of the present invention.

FIG. 10 is a flowchart illustrating a random access method by a terminal for uplink data transmission considering a coverage level in the related art and FIG. 11 is a flowchart illustrating a random access method for uplink data transmission of a terminal considering a coverage level and a subcarrier spacing and/or multi-tone configuration according to an example embodiment of the present invention.

Referring to FIG. 10, in the random access method considering the coverage level in the related art, the terminal selects the coverage level and thereafter, selects and transmits the corresponding preamble resource. Thereafter, when the terminal receives the RAR from the base station and transmits the Msg3 by the HARQ scheme, the terminal receives the Contention Resolution which is the response from the base station to complete the random access process. In this case, when the RAR is not received by the terminal or fail of the Msg3 HARQ transmission occurs or the Contention Resolution is not received by the terminal, the terminal reattempts the random access by performing the preamble transmission process in the same PRACH resource again. When the number of preamble transmission is more than the maximum number of preamble transmission determined from the base station during this process, the terminal determines that the selected coverage level is not appropriate to a current channel state, and changes the selected coverage level to the coverage level having a channel state lower by one step than the current channel state, and selects the preamble in the corresponding PRACH resource again to perform the random access procedure.

However, the procedure for reperforming the random access after changing the coverage level (CL) has a problem that an operation time and an delay time significantly increase because the terminal needs to perform a process for waiting for the physical RACH (PRACH) for performing the random access at the changed coverage level (CL) and the random access process in the corresponding PRACH again from the beginning.

Hereinafter, the random access method by the terminal considering the coverage level and the subcarrier spacing and/or multi-tone configuration according to the example embodiment of the present invention will be described.

In the case of the non-contention based random access process, the random access preamble is explicitly signaled from the base station (the random access preamble to be used is explicitly expressed).

In the case of the contention based random access process, the random access preamble is not explicitly signaled from the base station (the random access preamble to be used is not explicitly expressed).

Figure 12:
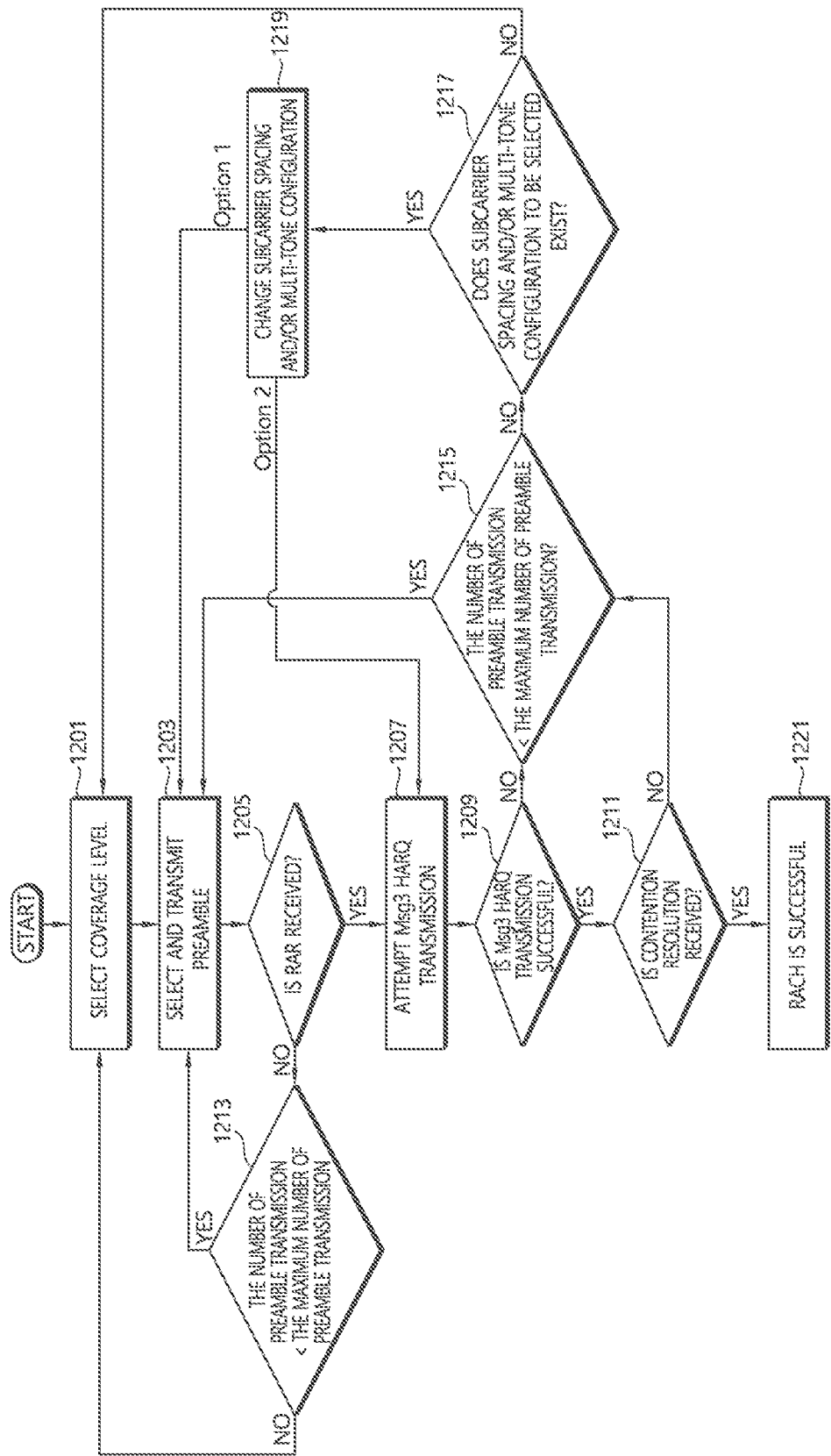
FIG. 12 is a flowchart illustrating a random access method for uplink data transmission of a terminal considering a coverage level and a subcarrier spacing and/or multi-tone configuration according to another example embodiment of the present invention.

Herein, the random access processes of FIGS. 11 and 12 may be performed when the random access preamble to be used is not explicitly signaled from the base station.

Referring to FIG. 11, by the random access method, performed by the terminal, for the uplink data transmission according to the example embodiment of the present invention, the terminal receives the random access response (RAR) from the base station during the RACH process to receive usable uplink resource information (step 1101).

In the allocated uplink resource, the terminal transmits the message (Mesg3) to request the connection for the uplink data transmission (step 1103) and the terminal checks whether the Msg3 is unsuccessfully transmitted or the Msg3 transmission fails due to the change in channel state, and the like (step 1105). When the Msg is not unsuccessfully transmitted or the Msg3 transmission does not fails, it is checked that the uplink transmission is successful (step 1107).

When the Msg3 is unsuccessfully transmitted or the Msg3 transmission fails, the terminal determines whether the number of unsuccessful Msg3 transmission or the number of failed Msg3 transmission is less than the maximum number of retransmission (step 1109). Herein, the maximum number of retransmission may be included in the downlink control information (DCI).

When the number of unsuccessful Msg3 transmission or the number of failed Msg3 transmission is less than the maximum number of retransmission times, the process returns to step 1101 and performs the RACH procedure again to receive usable uplink resource information from the base station and attempt transmission of the Msg3 again.

When the number of unsuccessful Msg3 transmission or the number of failed Msg3 transmission is not less than the maximum number of retransmission times, the terminal attempts the data (Msg3) transmission process by performing the RACH process again by changing the subcarrier spacing and/or multi-tone configuration to the subcarrier spacing and/or multi-tone configuration having a transmission rate, which is lower by one step than the current transmission rate, at the same coverage level (CL) according to the example embodiment of the present invention instead of the operation of changing the existing coverage level (CL). In this case, the terminal may attempt transmitting the Msg3 by immediately performing retransmission by using PRACH resource information which the base station preliminarily allocates to the random access response (RAR) by considering the change of the subcarrier spacing and/or multi-tone configuration according to the example embodiment of the present invention (Option 2) or performing the RACH process in the PRACH resource (alternatively, preamble resource) using the subcarrier spacing and/or multi-tone having a transmission rate, which is lower by one stage than the current transmission rate, within the same coverage level (CL) again (Option 1). When the terminal consecutively fails to the transmission even in the current subcarrier spacing and/or multi-tone configuration, the terminal receives the PRACH resource information corresponding to the corresponding coverage level (CL) by changing the coverage level to another coverage level and thereafter, performs the RACH process.

Hereinafter, by using a detailed example, the random access method by the terminal for the uplink data transmission according to the example embodiments of the present invention will be described.

When it is assumed that a specific terminal that performs the random access according to the example embodiment of the present invention is positioned at a CL2 area, the terminal selects and transmits the preamble resource by a 15 kHz single-tone configuration of initial CL2 and receive the random access response (RAR) which is the response to the preamble transmission from the base station.

The RAR which is the response to the preamble transmission from the base station is not received, and as a result, the preamble transmission may be attempted again and when the RAR is not consecutively received and the number of preamble transmission is thus more than the maximum number of preamble transmission, the terminal immediately selects the 3.75 kHz, single-tone configuration having the maximum transmission rate of the CL3 that supports a channel state lower by one stage than the current channel state, and thereafter, selects the preamble in the corresponding PRACH resource to perform the random access process again.

When the number of consecutive transmission failure of the Msg3 is more than the maximum number of retransmission during the random access process, the terminal thereafter attempts the Msg3 transmission process by performing the RACH process again by selecting the 3.75 kHz single-tone which is the subcarrier spacing and/or multi-tone configuration having a transmission rate, which is lower by one step than the current transmission rate, at the same coverage level (CL) according to the example embodiment of the present invention instead of the operation of changing the existing coverage level (CL). In this case, the terminal may attempt transmitting the data (Msg3) by immediately performing retransmission by using PRACH resource information which the base station preliminarily allocates to the random access response (RAR) by considering the change of the subcarrier spacing and/or multi-tone configuration according to the example embodiment of the present invention during the previous RACH process (Option 2) or performing the RACH process in the PRACH resource for the 3.75 kHz single-tone of the CL2 again (Option 1). When the number of consecutive transmission failure of the Msg3 is more than the maximum number of retransmission during the random access process even in the 3.75 kHz single-tone configuration, the terminal changes the coverage level to the CL3 and receives the PRACH resource information corresponding to the corresponding coverage level (CL) and thereafter, performs the RACH process.

FIG. 12 is a flowchart illustrating a random access method for uplink data transmission of a terminal considering a coverage level and a subcarrier spacing and/or multi-tone configuration according to another example embodiment of the present invention.

Referring to FIG. 12, by the random access method for uplink data transmission according to another example embodiment of the present invention, the terminal selects the coverage level for the random access process (step 1201) and selects and transmits the preamble resource corresponding thereto (step 1203). Thereafter, the terminal acquires the uplink resource for transmitting the Msg3 together with the RAR which is the response from the base station. The terminal may transmit the Msg3 by the HARQ scheme and when the terminal receives the Msg3 from the base station, the terminal may finally complete the random access process by receiving the contention resolution message from the base station.

The failure in random access process may occur because the terminal does not receive the RAR or unsuccessfully transmits the Msg3 or unsuccessfully receives the contention resolution. In respective cases, the terminal attempts transmitting the preamble again in order to reperform the random access process.

In the case where the terminal does not receive the RAR, that is, in the case where the terminal unsuccessfully transmits the preamble, the terminal reperforms the random access and determines whether the number of preamble transmission is more than the maximum number of preamble transmission (step 12130) and when the number of preamble transmission is more than the maximum number of preamble transmission times, the terminal immediately changes the coverage level to the coverage level to support a channel state lower by one step than the current channel state (step 1201). The reason is that since the random access preamble transmission is performed by using the 3.75 kHz single-tone configuration, the terminal is incapable of performing the random access preamble even with the lowest configuration at the corresponding coverage level.

The terminal attempts transmitting the Msg3 by the HARQ scheme (step 1207) and determines whether the Msg3 is successful transmitted by the HARQ scheme (step 1209) and when the Msg3 is successful transmitted by the HARQ scheme, the terminal determines whether the contention resolution is received (step 12110).

In the case where the terminal unsuccessfully transmits the Msg3 (unsuccessfully transmits the Msg3 by the HARQ scheme) or in the case where the terminal unsuccessfully receives the contention resolution, when it is determined that the number of preamble transmission is more than the maximum number of preamble transmission while the terminal reperforms the random access, the terminal may reperform the random access process through the method using the subcarrier spacing and/or multi-tone configuration according to the example embodiments of the present invention (steps 1217, 1219, 1203, and 1201). In detail, the terminal determines whether there is a subcarrier spacing and/or multi-tone configuration having a transmission rate lower by one step than the current transmission rate, which may be changed at the current coverage level (step 1217) and when there is the subcarrier spacing and/or multi-tone configuration, the terminal changes the subcarrier spacing and/or multi-tone configuration to the subcarrier spacing and/or multi-tone configuration having a transmission rate lower by one step than the current transmission rate, which may be changed at the current coverage level (step 1219) and thereafter, selects and transmits the preamble in the corresponding PRACH resource (step 1203) to reperform the random access process. In this case, the terminal may start the random access process the preamble transmission again according to the example embodiments of the present invention (Option 1) or immediately transmit the Msg3 by the HARQ scheme by using the uplink resource information which the base station preliminarily allocates to the RAR by considering the subcarrier spacing and/or multi-tone configuration change of the present invention while performing the previous random access (Option 2). When the terminal consecutively unsuccessfully transmits the Msg3 or unsuccessfully receives the contention resolution, the terminal performs the random access in the PRACH resource corresponding to the corresponding coverage level by changing the current coverage level to the lower coverage level by one step.

Hereinafter, by using a detailed example, the random access method by the terminal for the uplink data transmission according to another example embodiment of the present invention will be described.

When it is assumed that a specific terminal that performs the random access process of the uplink data transmission according to the example embodiment of the present invention is positioned at a CL2 area, the terminal selects and transmits the preamble resource by a 15 kHz single-tone configuration of initial CL2. The RAR which is the response to the preamble transmission from the base station is not received, and as a result, the preamble transmission may be attempted again and when the RAR is not consecutively received and the number of preamble transmission is thus more than the maximum number of preamble transmission, the terminal immediately selects the 3.75 kHz, single-tone configuration having the maximum transmission rate of the CL3 that supports a channel state lower by one stage than the current channel state, and thereafter, selects the preamble in the corresponding PRACH resource to perform the random access process again.

When the terminal consecutively unsuccessfully transmits the Msg3 after receiving the random access response (RAR) or unsuccessfully receives the contention resolution, the terminal may perform the random access by selecting the preamble in the same PRACH resource as the first selected configuration. When the number of transmission is more than the maximum number of transmission, the terminal performs the random access process again by selecting the preamble in the corresponding PRACH resource by selecting the 3.75 kHz single-tone which is the subcarrier spacing and/or multi-tone configuration having the lower transmission rate by one step within the same coverage level (CL or CL2) according to the example embodiment of the present invention instead of the operation of changing the existing coverage level (CL). In this case, the terminal may immediately transmit the Msg3 by using the uplink resource information which the base station preliminarily allocates to the random access response (RAR) by considering the change of the subcarrier spacing and/or multi-tone configuration according to the example embodiment of the present invention during the previous random access process (Option 2) or performing the random access process in the PRACH resource for the 3.75 kHz single-tone of the CL2 again (Option 1). When the terminal consecutively unsuccessfully transmits the Msg3 or does not receive the contention resolution even in the 3.75 kHz single-tone configuration, the terminal changes the coverage level to the CL3 and waits for the PRACH resource corresponding to the corresponding coverage level (CL) and thereafter, performs the random access process.

When it is assumed that a specific terminal for the random access method process of the uplink data transmission according to another example embodiment of the present invention is positioned on the edge of a CL1 area, the terminal selects the preamble resource by the 15 kHz single-tone configuration of initial CL2 and starts the random access process.

In this case, when the number of transmission is more than the maximum number of transmission due to the unsuccessful random access execution caused by not consecutively receiving the RAR, the terminal changes the coverage level to the CL2 which is the coverage level supporting a channel state lower by one step than the current channel state, and thereafter, selects the 15 kHz single-tone configuration supporting the highest transmission rate in the corresponding CL and performs the random access with the corresponding PRACH resource (preamble resource) again.

Alternatively, when the number of transmission is more than the maximum number of transmission due to unsuccessful Msg3 HARQ transmission or unsuccessful contention resolution reception after receiving the RAR, the terminal may reattempt the random access again by selecting the PRACH resource (alternatively, preamble resource) using the 15 kHz single-tone configuration which is the subcarrier spacing and/or multi-tone configuration having a transmission rate, which is lower by one step than the current transmission rate, within the same coverage level (CL) according to another example embodiment of the present invention instead of the operation of changing the existing coverage level (CL). In this case, the terminal may immediately transmit the Msg3 instead of transmitting the preamble by using the PRACH resource information which the base station preliminarily allocates to the random access response (RAR) by considering the change of the subcarrier spacing and/or multi-tone configuration according to another example embodiment of the present invention during the previous random access process (Option 2) or performing the random access process in the PRACH resource for the 15 kHz single-tone of the CL1 again as described above (Option 1). When the terminal consecutively unsuccessfully transmits the Msg3 or does not receive the contention resolution even in the 15 kHz single-tone configuration, the terminal may make the reattemption by the Option 1 or Option 2 operation again by changing the configuration to the 3.75 kHz single-tone configuration. When the terminal unsuccessfully transmits the Message 3 even in the 3.75 kHz single-tone configuration, the terminal determines that all configurations provided at the CL1 are unavailable in communication and may change the coverage level to the CL2 and thereafter, reperform the random access process or the Message 3 transmission process by the 15 kHz single-tone configuration provided at the corresponding CL.

That is, when the number of transmission is more than the maximum number of transmission due to unsuccessful Msg3 transmission or unsuccessful contention resolution reception during the random access process, the terminal may reperform the random access by the subcarrier spacing and/or multi-tone combination provided within the current coverage level and finally changes the current coverage level and stepwise perform the random access process for the uplink data transmission again when the terminal unsuccessfully transmits the Msg3 or unsuccessfully receives the contention resolution up to the last step of the provided subcarrier spacing and/or multi-tone configuration. However, when the number of transmission is more than the maximum number of transmission due to the failure in random access caused by not receiving the RAR, the terminal immediately changes the current coverage level to a channel state lower by one step than the current channel state to perform the random access process again.

Referring to FIG. 8, according to the example embodiment of the present invention, an example is illustrated, in which when the terminal performs the random access for the uplink data transmission, the PRACH resources (alternatively, preamble resources) are sequentially selected in an arrow direction so as to achieve stepwise performance according to the subcarrier spacing and/or multi-tone configuration after consecutive failure in random access during the Msg3 transmission or contention resolution reception.

According to another example embodiment of the present invention, when it is assumed that the specific terminal performing the random access of the terminal for the uplink data transmission is positioned on the edge of the CL1 area, the terminal may perform the random access process within the coverage level only by changing the subcarrier configuration.

Figure 13:
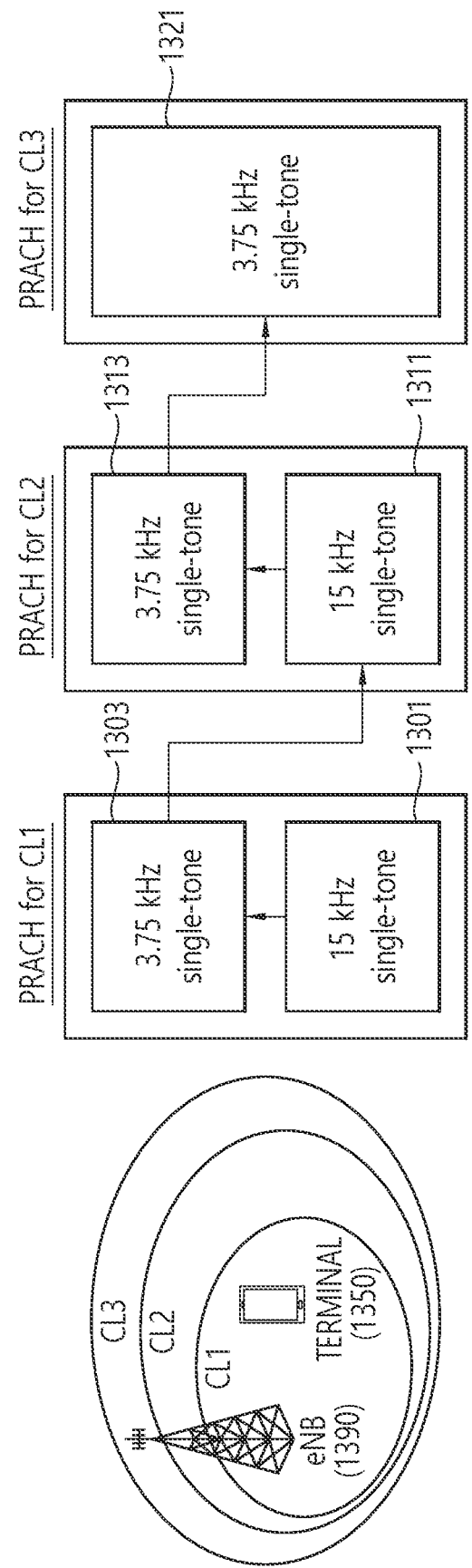
FIG. 13 is a flowchart illustrating an example of resource allocation for performing a random access for the uplink data transmission of the terminal considering the coverage level and a subcarrier spacing configuration according to another example embodiment of the present invention.

That is, referring to FIG. 13, when the terminal performs the random access by selecting the 15 kHz single-tone configuration of the initial CL1 and thereafter, consecutively unsuccessfully transmits the Msg3 or does not receive the contention resolution, the terminal changes the 15 kHz single-tone configuration of the CL1 which is the same coverage level to the 3.75 kHz single-tone configuration without changing the coverage level and thereafter, attempts the random access process. Thereafter, when the random access fails by the terminal, the terminal may change the coverage level to the CL2 and thereafter, uses the 15 kHz single-tone configuration and when the random access fails by the terminal again, the terminal may attempt the random access by the 3.75 kHz single-tone configuration. When the random access fails by the terminal again, the terminal may change the coverage level to the CL3 and thereafter, attempt the random access by the 3.75 kHz single-tone configuration last. In this case, in the case where the random access fails by the terminal, the terminal performs the random access and thus, the number of preamble retransmission is more than the maximum number of transmission due to unsuccessful Msg3 HARQ transmission or non-reception of the contention resolution message and the case is defined to have the same meaning even in a description to be mentioned below.

According to yet another example embodiment of the present invention, when it is assumed that the specific terminal performing the random access of the terminal for the uplink data transmission is positioned on the edge of the CL1 area, the terminal may perform the random access process within the coverage level only by changing the multi-tone configuration.

Figure 14:
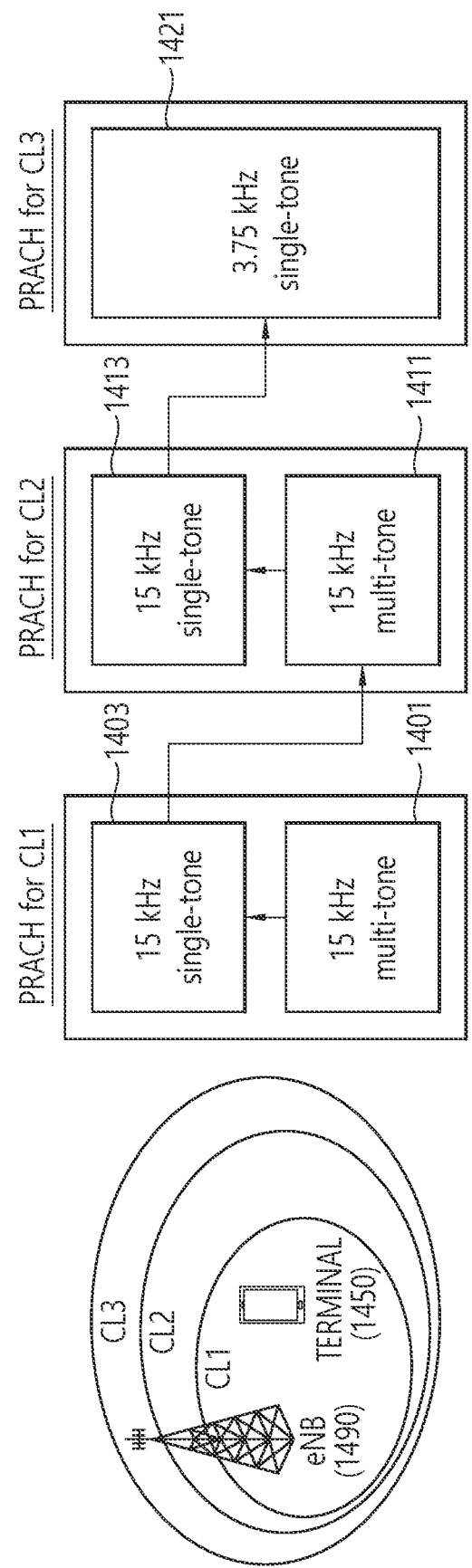
FIG. 14 is a flowchart illustrating an example of resource allocation for performing a random access for uplink data transmission of a terminal considering a coverage level and a subcarrier spacing configuration according to yet another example embodiment of the present invention.

That is, referring to FIG. 14, when the terminal performs the random access by selecting the 15 kHz multi-tone configuration of the initial CL1 and thereafter, consecutively unsuccessfully transmits the Msg3 or does not receive the contention resolution, the terminal attempts changing the subcarrier configuration from the 15 kHz multi-tone configuration of the CL1 which is the same coverage level to the 15 kHz multi-tone configuration without changing the coverage level. Thereafter, when the random access fails by the terminal, the terminal may change the coverage level to the CL2 and thereafter, uses the 15 kHz multi-tone configuration and when the random access fails by the terminal again, the terminal may attempt the random access by the 15 kHz single-tone configuration. When the random access fails by the terminal again, the terminal may attempt the random access by the 3.75 kHz single-tone configuration of the CL3 last. In this case, in the case where the random access fails by the terminal, the terminal performs the random access and thus, the number of preamble retransmission is more than the maximum number of transmission due to unsuccessful Msg3 HARQ transmission or non-reception of the contention resolution message and the case is defined to have the same meaning even in a description to be mentioned below.

Figure 15:
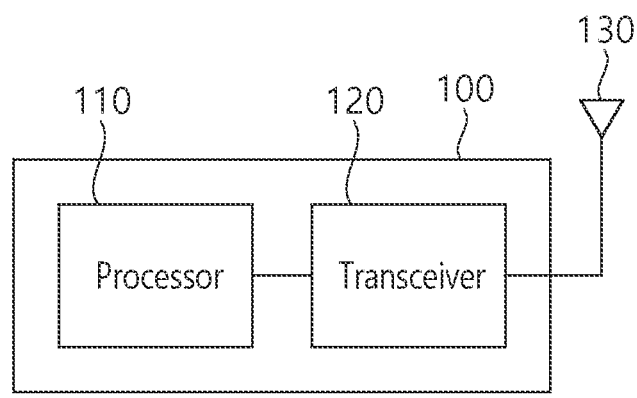
FIG. 15 is a schematic block diagram of an NB-IoT terminal according to an example embodiment of the present invention.
Figure 16:
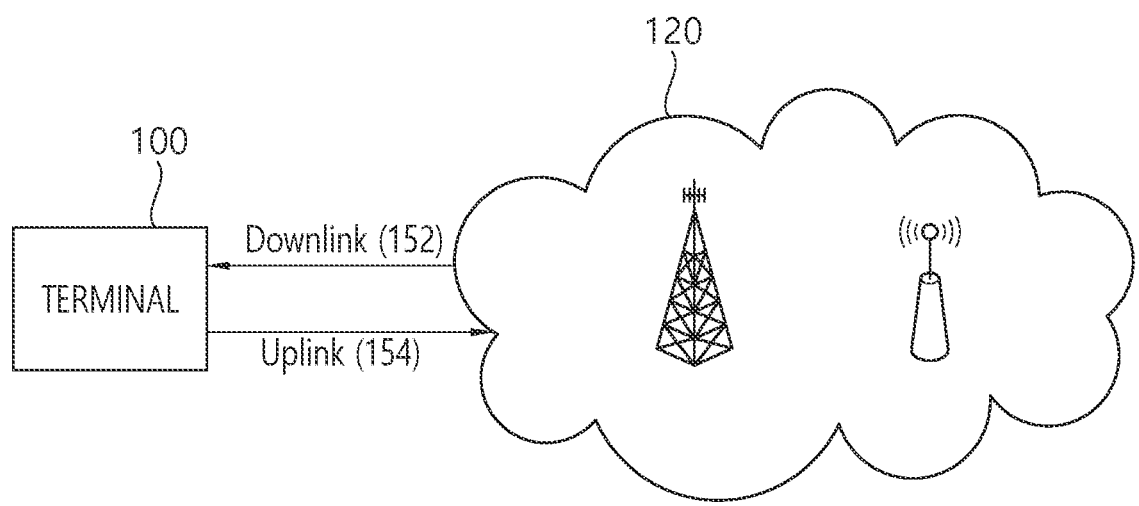
FIG. 16 is a schematic block diagram of an NB-IoT communication system according to an example embodiment of the present invention.

FIG. 15 is a schematic block diagram of an NB-IoT terminal according to an example embodiment of the present invention and FIG. 16 is a schematic block diagram of an NB-IoT communication system according to an example embodiment of the present invention.

Referring to FIGS. 15 and 16, the NB-IoT terminal 100 is constituted by a transceiver 120, a processor 110, and an antenna 130 to performs the random access method considering the random access procedure, the coverage level for the uplink data transmission, and the subcarrier-spacing and/or multi-tone configuration for the uplink data transmission according to the example embodiments of the present invention described above with a base station 120.

The transceiver 120 transmits or receives a radio frequency signal to or from the base station 120 through an antenna 130, receives data and a control signal from the base station through the antenna 130 through downlink 152, and transmits the data and the control signal to the base station 120 through uplink 154.

The processor 110 may determine the time of transmitting the control signal by controlling the transceiver 100. The processor 110 performs the random access method considering the random access procedure, the coverage level for the uplink data transmission, and the subcarrier spacing and/or multi-tone configuration according to the example embodiments of the present invention.

The machine communication terminal, for example, the NB-IoT terminal, the machine type communication (MTC) terminal, and a terminal in enhanced coverage may include the transceiver transmitting or receiving the radio frequency signal to or from the base station through the antenna and the processor determining the time of transmitting the radio frequency signal by controlling the transceiver. The processor processes a step of performing the random access process between the machine communication terminal and the base station and the random access process may include a step of selecting the physical random access channel (PRACH) resource by considering the coverage level and whether to support the multi-tone transmission or not. In detail, the radon access process may include the step of selecting the physical random access channel (PRACH) resource by considering the coverage level and whether to support the multi-tone transmission or not.

The machine communication device may include the transceiver transmitting or receiving the radio frequency signal to or from the base station through the antenna and the processor determining the time of transmitting the radio frequency signal by controlling the transceiver. The processor processes the step of performing the random access process between the machine communication terminal and the base station and the random access process may include the step of selecting the physical random access channel (PRACH) resource by considering the coverage level and whether to support the multi-tone transmission or not. In detail, the radon access process may include the step of selecting the physical random access channel (PRACH) resource by considering the coverage level and whether to support the multi-tone transmission or not.

The processor 110 may be a universal processor, a special-purpose processor, a conventional processor, a digital signal processor (DSP), a microprocessor, one or more microprocessors associated with a DSP core, a controller, a microcontroller, application specific integrated circuits (ASICs), field programmable gate array (FPGA) circuits, an integrated circuit (IC), a state machine, and the like. The processor 110 may perform signal coding, data processing, power control, input/output processing, and/or predetermined other functions which enable the terminal to operate a wireless environment. The processor 110 may be coupled to the transceiver 120.

In FIG. 14, the processor 110 and the transceiver 120 are illustrated as separate components, but the processor 110 and the transceiver 120 may be integrated in an electronic package or chip together.

For example, in the example embodiment, the antenna 130 may be an antenna that is configured to transmit and/or receive RF signals. In another example embodiment, the antenna 130 may be, for example, a radiator/detector that is configured to transmit and/or receive IR, UV, or visible-ray signals. In yet another example embodiment, the antenna 130 may be configured to transmit and receive both the RF signals and optical signals. The antenna 130 may be configured to transmit and/or receive a predetermined combination of the radio frequency signals. The transceiver 120 may be configured to modulate signals to be transmitted by the antenna 130 and demodulate signals received by the antenna 130.

The base station performing the random access process for the uplink data transmission with the cellular based machine communication terminal is constituted by the transceiver, the processor to perform may perform the random access method considering the random access procedure, the coverage level for the uplink data transmission, and the subcarrier spacing and/or multi-tone configuration according to the example embodiments of the present invention described above with the NB-IoT terminal.

The base station performing the random access process for the uplink data transmission with the cellular based machine communication terminal may include the transceiver transmitting or receiving the radio frequency signal to or from the machine communication terminal through the antenna and the processor determining the time of transmitting the radio frequency signal by controlling the transceiver. The processor processes a step of receiving the random access preamble from the machine communication terminal, a step of transmitting the random access response (RAR) message to the machine communication terminal, a step of receiving the message (Message 3) to request the connection for the uplink data transmission, and a step of transmitting the contention resolution to announce that the Message which the machine communication terminal transmits to the machine communication terminal is received by the base station and the random access process may be implemented to configure the physical random access channel (PRACH) resource by considering the coverage level and the multi-tone configuration. In detail, the radon access process may be implemented to configure the physical random access channel (PRACH) resource by considering the coverage level and the subcarrier spacing and/or multi-tone configuration.

The base station may communicate with one or more terminals through an air interface which a predetermined appropriate wireless communication link (for example, a radio frequency (RF), microwaves, infrared (IR), ultraviolet (UV), visible rays, and the like).

The NB-IoT communication system may become a multi-access system and adopt channel access schemes including CDMA, TDMA, FDMA, OFDMA, SC-FDMA, and the like. For example, the base station and the NB-IoT terminal of the RAN may implement a radio technology such as Universal Mobile Telecommunications System (UMTS) terrestrial radio access (UTRA) capable of configuring the air interface by using wideband CDMA (WCDMA). The WCDMA may include a communication protocol such as high-speed packet access (HSPA) and/or evolved HSPA (HSPA+). The HSPA may include High-Speed Downlink Packet Access (HSDPA) and/or High-Speed Uplink Packet Access (HSUPA). In another example embodiment, the base station and the MTC terminals may implement the radio technology such as evolved UTRA (E-UTRA) capable of configuring the air interface by using Long Term Evolution (LTE) and/or LTE-Advanced (LTE-A).

In other example embodiments, the base station and the NB-IoT terminal may implement radio technologies including IEEE 802.16 (that is, Worldwide Interoperability for Microwave Access (WiMAX)), CDMA2000, CDMA2000 1x, CDMA 2000 evolution-data optimized (EV-DO), interim standard 2000 (IS-2000), interim standard 95 (IS-95), interim standard 856 (IS-856), Global System for Mobile communications (GSM), Enhanced Data rates for GSM Evolution (EDGE), GSM/EDGE RAN (GERAN), and the like.

The base station of FIG. 16 may be, for example, a wireless router, HNB, HeNB, or an AP and adopt a predetermined appropriate RAT which enables radio access in a localized area such as places including business, home, vehicles, campuses, and the like. In the example embodiment, the base station and the NB-IoT terminal may implement a radio technology such as IEEE 802.11 in order to configure a wireless local area network (WLAN). In another example embodiment, the base station and the terminals may implement a radio technology such as IEEE 802.15 in order to configure a wireless personal local area network (WPLAN). In yet another example embodiment, the base station and the NB-IoT terminals may use cellular based RATs (for example, WCDMA, CDMA2000, GSM, LTE, LTE-A, and the like) in order to configure a pico cell or a femto cell. The base station may directly access the Internet. Therefore, the base station may not be required to access the Internet through a core network.

Figure 17:
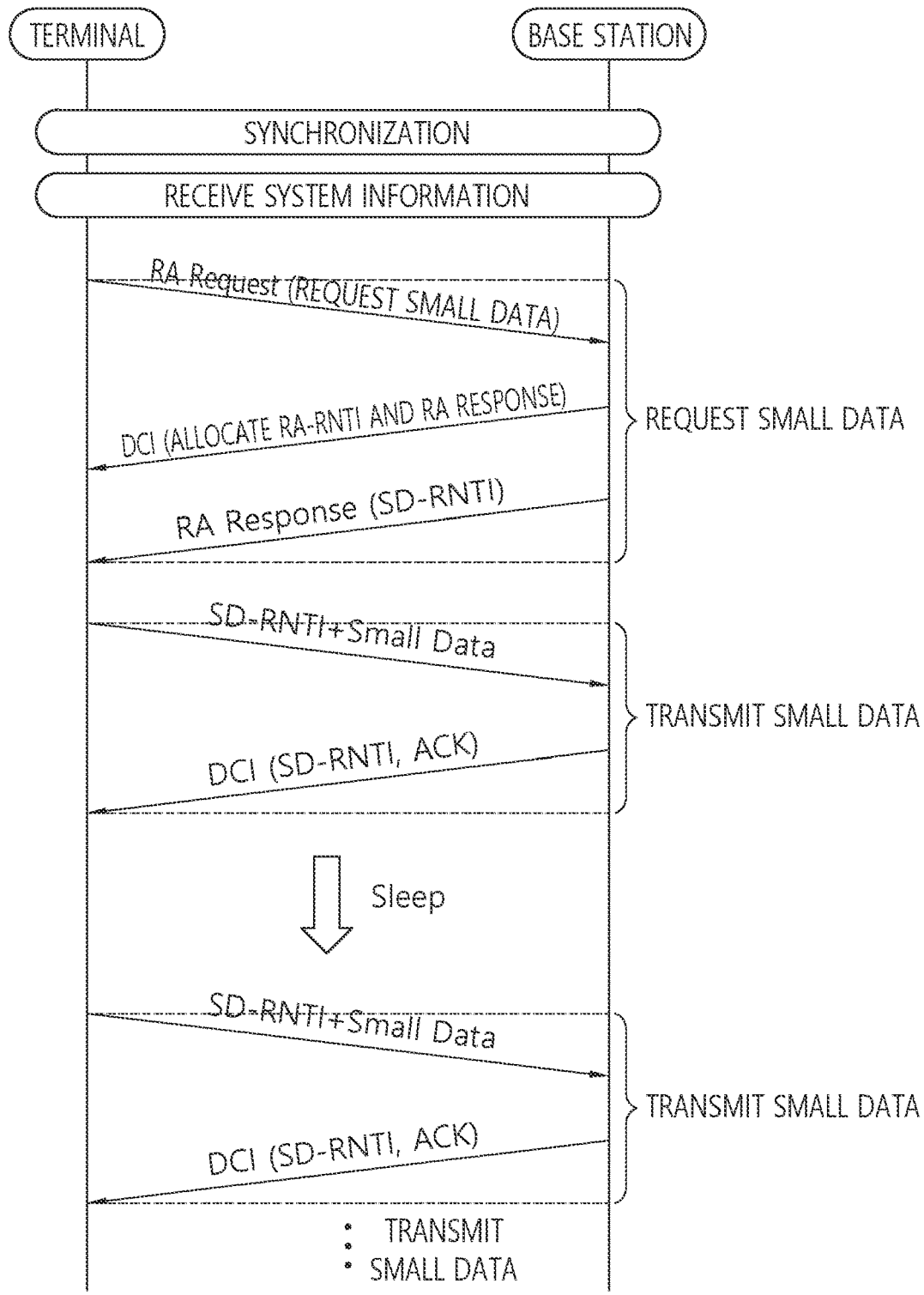
FIG. 17 is a flowchart of a message exchange procedure with a base station, which is used for describing a transmission request and a transmission process of small data of an NB-IoT terminal according to an example embodiment of the present invention.

FIG. 17 is a flowchart for describing a transmission request and a transmission process of small data according to an example embodiment of the present invention.

In FIG. 17, the small data transmission request process is illustrated. The terminal transmits the random access (RA) request message (Msg1) in order to perform the random access, and a type or an access cause of the RA request modified during such a process is expressed as 'small data request' and transmitted. The base station receives the request and thereafter, transmits the DCI in order to announce a resource to transmit the RA response (Msg2). Further, the base station determines whether the resource for transmitting the small data may be allocated to the corresponding terminal. Whether to support the small data may be determined by determining complexity of the random access resource for the small data at the time of receiving the request. When the base station may support transmission of the small data to the corresponding terminal, the base station transmits the RA response message (Msg2) by using Small Data Radio Network Temporary Identifier (SD-RNTI) information which is newly defined instead of C-RNTI.

The terminal which is allocated with the SD-RNTI may thereafter perform efficient data transmission through the small data transmission process of the present invention. In detail, during the small data transmission process, the terminal transmits the Msg1 including data together the SD-RNTI, which is transmitted at the time of performing the random access. The base station that receives the data through the RA request (Msg1) may transmit an ACK to the corresponding terminal through the subsequent DCI.

In the conventional data transmission scheme, the resource for uplink transmission is acquired by performing the random access and thereafter, uplink data is transmitted and the DCI is received again to verify whether the transmission is successful. The small data transmission process of the present invention allows the Msg1 including the data to be transmitted at the time of transmitting the Msg1 to reduce a transmission delay time and power consumption of the terminal. Such a process may be performed until the terminal may not maintain the SD-RNTI any longer and a termination criterion of the SD-RNTI may be defined as the number of transmission, a transmission amount (bits), an allocation time, and the like of the terminal in the network in advance and transferred through the Msg2.

What is claimed is:

1. A random access method for uplink data transmission during a random access process, the method comprising:
    performing the random access process between a cellular based machine communication terminal and a base station,
    wherein, in narrow band-Internet of Things (NB-IoT), which subcarrier spacing among 3.75 kHz and 15 kHz is used is indicated by using 1 bit in an uplink (UL) grant of a random access response (RAR) message transmitted by the base station,
    wherein, in response to there being no subcarrier resource for a multi-tone MSG3 transmission, a subcarrier for a single-tone MSG3 transmission is used, and the MSG3 is a message by which the terminal performs a connection request to the base station for uplink data transmission, and
    wherein, in response to the terminal not receiving the RAR message, the terminal determines whether a number of preamble transmissions is more than a maximum number of preamble transmissions.

2. The method of claim 1, wherein a physical random access channel (PRACH) resource is constituted by a single-tone preamble numbered with $0, 1, \ldots, N_{sc}^{NPRACH} N_{MSG3}^{NPRACH}-1$) and a multi-tone preamble numbered with $(N_{sc}^{NPRACH} N_{MSG3}^{NPRACH}), \ldots, (N_{sc}^{NPRACH}-1)$, and the PRACH resource is defined as the following parameters transmitted from the base station the terminal: $N_{period}^{NPRACH}$—NPRACH resource periodicity, $N_{scoffset}^{NPRACH}$—frequency location of a first sub-carrier allocated to NPRACH, $N_{sc}^{NPRACH}$—a number of sub-carriers allocated to NPRACH, $N_{rep}^{NPRACH}$—a number of NPRACH repetitions per attempt, $N_{start}^{NPRACH}$—NPRACH starting time, and $N_{MSG3}^{NPRACH}$—fraction for calculating a starting subcarrier index for a range of NPRACH subcarriers reserved for indication of user equipment (UE) support for multi-tone MSG3 transmission.

3. The method of claim 1, wherein, in response to a number of preamble transmissions being more than a maximum number of preamble transmissions, a coverage level is changed and the number of preamble transmissions is initialized.

* * * * *